United States Patent [19]
Matsushita et al.

[11] Patent Number: 6,035,292
[45] Date of Patent: Mar. 7, 2000

[54] INTERACTIVELY BUILDING AND EXECUTING KNOWLEDGE BASE SYSTEM WITH KNOWLEDGE VARIABLES

[75] Inventors: Seitaro Matsushita; Masatoshi Itoh, both of Tokyo; Mamoru Kawanobe, Higashiyamato, all of Japan

[73] Assignee: Comnes Co., Ltd., Tokyo, Japan

[21] Appl. No.: 08/877,562

[22] Filed: Jun. 17, 1997

[30] Foreign Application Priority Data

Feb. 6, 1997 [JP] Japan .................................... 9-038307

[51] Int. Cl.$^7$ ...................................................... G06F 15/18
[52] U.S. Cl. ................................................ 706/45; 706/47
[58] Field of Search ............................. 395/709; 706/45, 706/46, 47, 48; 707/2

[56] References Cited

U.S. PATENT DOCUMENTS

| | | |
|---|---|---|
| 4,930,071 | 5/1990 | Tou et al. ..................................... 707/4 |
| 5,043,915 | 8/1991 | Suwa et al. ................................. 706/47 |
| 5,047,951 | 9/1991 | Ono ............................................. 706/48 |
| 5,208,898 | 5/1993 | Funabashi et al. ........................ 706/45 |
| 5,212,768 | 5/1993 | Itsuki et al. ................................ 706/50 |
| 5,228,116 | 7/1993 | Harris et al. ............................... 706/50 |
| 5,241,621 | 8/1993 | Smart .......................................... 706/45 |
| 5,251,285 | 10/1993 | Inoue et al. ................................ 706/10 |
| 5,267,156 | 11/1993 | Nomiyama ................................. 704/10 |
| 5,303,147 | 4/1994 | Oba et al. ..................................... 705/8 |
| 5,347,614 | 9/1994 | Yamada et al. ............................ 706/59 |
| 5,630,025 | 5/1997 | Dolby et al. ............................... 706/46 |
| 5,659,724 | 8/1997 | Borgida et al. .............................. 707/3 |
| 5,682,466 | 10/1997 | Maeda et al. .............................. 706/46 |
| 5,809,493 | 9/1998 | Ahamed et al. ........................... 706/52 |

OTHER PUBLICATIONS

Ye et al., "On the design and evelopment of scheduleing system", IEEE pp. 197–204, Jun. 1994.
Steinke, "An approach to achieving multi user integrity in a knowledge base system", IEEE, pp. 346–349, 1992.
Orman, "Rule by example an example based approach to knowledge base management", IEEE pp. 377–383, Jan. 1992.
Turng et al., "A knowledge base system for the design and manufature of injection molded plastic products", IEEE, pp. 95–98, May 1998.
Frarernali et al., "A structured apprach for the definition of the semantics of active databases", ACM Trans. Database Sys. vol. 20, No. 4, pp. 414–471, Dec. 1995.
Yanagisawa et al, "Design and implementation of an animation system using deductive object oriented programming", IEEE, pp. 239–242, Mar. 1997.
Riedesel, "An object oriented model for expert system shell design", IEEE, pp. 699–705, May 1990.
J. M. Lin, entitled "Issues On Deterministic Transformation Of Logic–Based Program Specification", published on Nov. 6, 1990 for Proceedings Of The International Conference On Tools For Artificial Intelligence, Herndon, Nov. 6, 1990, NR. Conf. 2, at pp. 603–609, Institute of Electrical and Electronics Engineers.
V. West et al., entitled "A Spreadsheet With Visible Logic", published on Nov. 1, 1990 for ICL Technical Journal, vol. 7, No. 2, pp. 319–327.

*Primary Examiner*—Tariq R. Hafiz
*Assistant Examiner*—Anil Khatri
*Attorney, Agent, or Firm*—Greenblum & Bernstein, P.L.C.

[57] ABSTRACT

A knowledge base system for building a knowledge base. The knowledge base system includes an interface device that receives said knowledge base by a user, and a generating device that generates a program based upon the knowledge base. The interface device includes a field that stores an output knowledge variable, input and local fields that store knowledge variables for operating the output knowledge variables, and a field that stores a computing equation of declarative representation that utilizes knowledge variables using operands as other knowledge variables. The generating device includes a translating device that translates the computing equation of declarative representation into a computer program, a retrieving device that retrieves a dependence of the output knowledge variable on other knowledge variables, and a setting device that sets an execution sequence of the computer program for instructing an input request and computation with reference to the dependence, in which the knowledge base system includes at least one alternative solution.

14 Claims, 21 Drawing Sheets

FIG. 2

20 (KNOWLEDGE SHEET)

| KNOWLEDGE VARIABLE | OPERATION |
|---|---|
| VOLUME (OUTPUT) | AREA x HEIGHT |
| AREA (LOCAL) | DEPTH x WIDTH |
| HEIGHT (INPUT) | INPUT |
| DEPTH (INPUT) | INPUT |
| WIDTH (INPUT) | INPUT |

26 — VOLUME (OUTPUT) row; 32a — AREA x HEIGHT
28 — AREA (LOCAL) row; 32b — DEPTH x WIDTH
30a — HEIGHT (INPUT); 32c — INPUT
30b — DEPTH (INPUT); 32d — INPUT
30c — WIDTH (INPUT); 32e — INPUT

| KNOWLEDGE VARIABLE (VOLUME) |
|---|
| LOAD "AREA" <br> LOAD "HEIGHT" <br> x |

22 (COMPUTER PROGRAM)

(B)

24 (ATTRIBUTES)

| KNOWLEDGE SHEET (VOLUME) | | |
|---|---|---|
| KNOWLEDGE VARIABLE | OPERATION | INPUT/OUTPUT |
| VOLUME | WAIT | OUTPUT |
| AREA | WAIT | LOCAL |
| HEIGHT | WAIT | INPUT |

KNOWLEDGE TABLE
(SPRING TYPE)

| SPRING TYPE | SPRING CONSTANT |
|---|---|
| B001 | 0.5 |
| B002 | 1.04 |
| B003 | 1.92 |

(B)

KNOWLEDGE SHEET
(SPRING SELECTION) — 20

| KNOWLEDGE VARIABLE | INPUT/OUTPUT | DATA TYPE | OPERATION (computing equation) |
|---|---|---|---|
| LOAD | INPUT | NUMERICAL | |
| SPRING DEFLECTION | LOCAL | NUMERICAL | LOAD / SPRING CONSTANT |
| SPRING CONSTANT | LOCAL | NUMERICAL | select SPRING CONSTANT from SPRING TYPE TABLE using SPRING TYPE |
| SPRING TYPE | OUTPUT | TEXT | taken from "B001", "B002", "B003" |
| DEFLECTION CONDITION | LOCAL | CONDITION | SPRING DEFLECTION <= 100 |
| DEFLECTION MAXIMIZATION | LOCAL | OPTIMIZATION | maximize(SPRING DEFLECTION) |

F I G. 8

KNOWLEDGE TABLE
(WATER COMPRESSIBILITY)

|  |  | TEMPERATURE | | |
|---|---|---|---|---|
|  |  | 0 | 10 | 20 |
| PRESSURE | 1<=..<25 | 5.08E−05 | 4.84E−05 | 4.75E−05 |
|  | 25<=..<50 | 4.99E−05 | 4.76E−05 | 4.61E−05 |
|  | 50<=..<75 | 4.93E−05 | 4.58E−05 | 4.41E−05 |
|  | 75<=..<100 | 4.86E−05 | 4.55E−05 | 4.38E−05 |

F I G. 9.

TABLE ATTRIBUTE DESCRIPTION — 16a

TABLE NAME = SPRING TYPE

NUMBER OF CONDITIONS = 3
NUMBER OF OUTPUT ITEMS = 3

TABLE INPUT ITEM DESCRIPTION
(SPRING TYPE NAME)

TABLE OUTPUT ITEM DESCRIPTION
(SPRING CONSTANT)

| OUTPUT VARIABLES | PROGRAMS |
|---|---|
| 0.5 | ... |
| 1.04 | ... |
| 1.92 | ... |

FIG. 10

| OUTPUT VALUE | PASCAL-LINGUISTIC DESCRIPTION | TRANSLATED PROGRAMS |
|---|---|---|
| 0.5 | SPRING TYPE NAME = 'B001' | Load SPRING TYPE NAME<br>LoadConstS 'B001'<br>EqualS |
| 1.04 | SPRING TYPE NAME = 'B002' | Load SPRING TYPE NAME<br>LoadConstS 'B002'<br>EqualS |
| 1.92 | SPRING TYPE NAME = 'B003' | Load SPRING TYPE NAME<br>LoadConstS 'B003'<br>EqualS |

F I G. 1 1

16b

SHEET ATTRIBUTE DESCRIPTION

SHEET NAME = SPRING SELECTION

LIST OF CONDITION ITEMS = DEFLECTION CONDITION

LIST OF OPTIMIZATION ITEMS = DEFLECTION MAXIMIZATION

LIST OF KNOWLEDGE VARIABLES =
        LOAD, SPRING DEFLECTION,
        SPRING CONSTANT, SPRING TYPE,
        DEFLECTION CONDITION,
        DEFLECTION MAXIMIZATION.

| KNOWLEDGE VARIABLES DESCRIPTION | | | | | |
|---|---|---|---|---|---|
| VARIABLE NAMES | STATE | OUTPUT | OPT. | SEL. | PROG. |
| LOAD | WAIT | | | | ... |
| SPRING DEFLECTION | WAIT | | | | ... |
| SPRING CONSTATNT | WAIT | | | | ... |
| SPRING TYPE | WAIT | ○ | | ○ | ... |
| DEFLECTION CONDITION | WAIT | | | | ... |
| DEFLECTION MAXIMIZATION | WAIT | | ○ | | ... |

F I G. 1 2

| INSTRUCTION NAME | FUNCTION | INSTRUCTION NAME | FUNCTION |
|---|---|---|---|
| Nop | NO OPERATION | Multiply | MULTIPLICATION |
| Load | LOAD VARIABLE VALUE | Divide | DIVISION |
| LoadGenReg | LOAD SELECTION REGISTER | Modulo | REMAINDER OF DIVISION |
| LoadConstN | LOAD NUMERICAL CONSTANT | LogicalAND | LOGICAL AND |
| LoadConstS | LOAD CHARACTER STRING CONSTANT | LogicalOR | LOGICAL OR |
| LoadStack | DUPLICATE STACK TOP | EqualN | EQUAL (NUMERICAL VALUE) |
| CallStdFunc | CALL INSTALLED FUNCTION | EqualS | EQUAL (CHARACTER STRING) |
| Stop | STOP (SUCCESS) | NotEqualN | NOT EQUAL (NUMERICAL VALUE) |
| Fail | STOP (FAIL) | NotEqualS | NOT EQUAL (CHARACTER STRING) |
| JumpIfTrue | IF TRUE JUMP | LessThan | LESS THAN |
| JumpIfFalse | IF FALSE JUMP | GreaterThan | GREATER THAN |
| TakenFrom | SELECT SELECTION VALUE | LessOrEqual | LESS OR EQUAL |
| SelectFromTable | REFER TO TABLE | GreaterOrEqual | GREATER OR EQUAL |
| Pop | DISPOSE STACK TOP | MemberOfNumSet | MEMBER OF SET (NUMERICAL VALUE) |
| Xchg | EXCHANGE STACK | MemberOfStrSet | MEMBER OF SET (CHARACTER STRING) |
| Fpower | POWER | OrderOfNumSet | ORDER OF MEMBERS (NUMERICAL VALUE) |
| SignChange | INVERT SIGN | OrderOfStrSet | ORDER OF MEMBERS (CHARACTER STRING) |
| Add | ADDITION | Negate | NEGATION |
| Subtract | SUBTRACTION | | |

FIG. 13

| DEFLECTION CONDITION | SPRING DEFLECTION | SPRING CONSTANT |
|---|---|---|
| Load SPRING DEFLECTION | Load LOAD | LoadConstN TABLE OUTPUT ITEMS ID |
| LoadConstN 100 | Load SPRING CONSTANT | LoadConstN TABLE DISCRIPTED ID |
| LessOrEqual | Diviede | Load SPRING TYPE |
| Stop | Stop | SelectFromTable |
| | | Stop |

F I G. 1 6

| DESIGN VARIABLE | I/O | TYPE | VALUE CALCULATED METHOD |
|---|---|---|---|
| INPUT COMMODITY | INPUT | CHAR | |
| INPUT WEIGHT | INPUT | NUME | |
| REQUESTED DELIVERY PERIOD | OUTPUT | NUME | select PERIOD from COMMODITY TABLE using INPUT COMMODITY |
| HANDLING | OUTPUT | NUME | select HANDLING from COMMODITY TABLE using INPUT COMMODITY |
| MARKET NUMBER | LOCAL | NUME | for 1 to 8 step 1 |
| MARKET CANDIDATE | OUTPUT | CHAR | select MARKET CANDIDATE from MARKET TABLE using MARKET NO. |
| MARKET DELIVERY PERIOD | LOCAL | NUME | select PERIOD from QUOTATION TABLE 2 using MARKET CANDIDATE, INPUT COMMODITY |
| MARKET DISTANCE | LOCAL | NUME | select DISTANCE from QUOTATION TABLE 2 using MARKET CANDIDATE, INPUT COMMODITY |
| DELIVERY PERIOD CONDITION | LOCAL | COND | MARKET DELIVERY PERIOD <= REQUESTED DELIVERY PERIOD |
| QUOTATION | OUTPUT | NUME | select QUOTATION from QUOTATION TABLE 2 using MARKET CANDIDATE, INPUT COMMODITY |
| SALES | OUTPUT | NUME | QUOTATION x INPUT WEIGHT |
| BASIC CHARGE | LOCAL | NUME | select BASIC from TRANSPORTATION TABLE using MARKET DISTANCE |
| ADDITIONAL UNIT PRICE | LOCAL | NUME | select ADD1 from TRANSPORTATION TABLE using MARKET DISTANCE |
| ADDITIONAL CHARGE 1 | LOCAL | NUME | ADDITIONAL UNIT PRICE x INPUT WEIGHT |
| ADDITIONAL CHARGE 2 | LOCAL | NUME | select ADD2 from ADDITIONAL INCREASE TABLE using MARKET DISTANCE, HANDLING |
| TRANSPORTATION CHARGE | OUTPUT | NUME | BASIC CHARGE 1 + ADDITIONAL CHARGE 1 + ADDITIONAL CHARGE 2 |
| PROFIT | OUTPUT | NUME | SALES - TRANSPORTATION CHARGE |
| MAXIMIZE PROFIT | LOCAL | OPTI | MAXIMIZE (PROFIT) |
| BASIC CHARGE 1 | LOCAL | NUME | BASIC CHARGE x INPUT WEIGHT |

FIG. 17

[COMMODITY TABLE]

| INPUT COMMODITY (CHAR) | PERIOD (NUME) | HANDLING (NUME) |
|---|---|---|
| APPLE | +1 | +2 |
| GRAPE | +2 | +1 |
| ORANGE | +5 | +0 |

FIG. 18

[MARKET CANDIDATE]

| MARKET NO. | MARKET (CHAR) |
|---|---|
| 1 | MARKET 1 |
| 2 | MARKET 2 |
| 3 | MARKET 3 |
| 4 | MARKET 4 |
| 5 | MARKET 5 |
| 6 | MARKET 6 |
| 7 | MARKET 7 |
| 8 | MARKET 8 |

FIG. 19

[QUOTATION TABLE 2 (PERIOD)]

|  | APPLE | GRAPE | ORANGE |
|---|---|---|---|
| MARKET 1 | +3 | +3 | +3 |
| MARKET 2 | +3 | +3 | +3 |
| MARKET 3 | +2 | +2 | +2 |
| MARKET 4 | +2 | +2 | +2 |
| MARKET 5 | +2 | +2 | +2 |
| MARKET 6 | +1 | +1 | +1 |
| MARKET 7 | +1 | +1 | +1 |
| MARKET 8 | +2 | +2 | +2 |

FIG. 20

[QUOTATION TABLE 2 (DISTANCE)]

|  | APPLE | GRAPE | ORANGE |
|---|---|---|---|
| MARKET 1 | +1000 | +1000 | +1000 |
| MARKET 2 | +800 | +800 | +800 |
| MARKET 3 | +600 | +600 | +600 |
| MARKET 4 | +550 | +550 | +550 |
| MARKET 5 | +400 | +400 | +400 |
| MARKET 6 | +300 | +300 | +300 |
| MARKET 7 | +150 | +150 | +150 |
| MARKET 8 | +350 | +350 | +350 |

FIG. 21

[QUOTATION TABLE 2 (QUOTATION)]

|  | APPLE | GRAPE | ORANGE |
|---|---|---|---|
| MARKET 1 | +1500 | +1500 | +1500 |
| MARKET 2 | +1200 | +1200 | +1200 |
| MARKET 3 | +1255 | +1255 | +1255 |
| MARKET 4 | +1250 | +1250 | +1250 |
| MARKET 5 | +1253 | +1253 | +1253 |
| MARKET 6 | +800 | +800 | +800 |
| MARKET 7 | +500 | +500 | +500 |
| MARKET 8 | +700 | +700 | +700 |

FIG. 22

[TRANSPORTATION TABLE]

| MARKET DISTANCE | BASIC (NUME) | ADD1 (NUME) |
|---|---|---|
| $0 <= .. < 100$ | +30 | +0 |
| $101 <= .. < 200$ | +50 | +0 |
| $201 <= .. < 300$ | +55 | +0 |
| $301 <= .. < 400$ | +60 | +0 |
| $401 <= .. < 500$ | +65 | +0 |
| $501 <= .. < 700$ | +70 | +20 |
| $701 <= .. < 900$ | +75 | +20 |
| $901 <= .. < 1000$ | +100 | +50 |

F I G. 2 3

[ADDITIONAL INCREASE TABLE]

|  | 2 | 1 | 0 |
|---|---|---|---|
| 0<=..<=900 | +1000 | +500 | +0 |
| 901<=..<=1000 | +2000 | +1000 | +0 |

F I G. 2 4

| STATUS | GENERATE | SHEET NAME | MARKET QUOTATION | ▼ |
|---|---|---|---|---|

```
Version Modification leve 0
nSheetSet       =1
nSheet          =1
nVariable       =34
nInstruction    =3264
nTable          =5
nTableItem      =108
nTableDeta      =9
nSet            =7
nSetElement     =31
StringStreamSize =943
```

F I G. 2 5
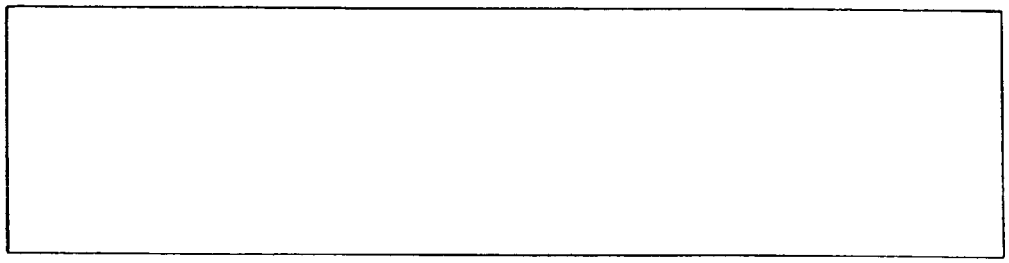
F I G. 2 6
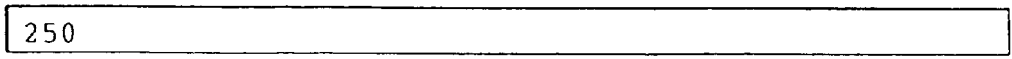

F I G. 2 7

| EXECUTION OF KNOWLEDGE SHEET |
|---|

| STATUS | SUCCESS | SHEET NAME | MARKET QUOTATION |

Execute sheet MARKET QUOTATION
✳✳✳✳✳————————————————
✳✳✳✳✳Execute sheet MAXIMIZE PROFIT
✳✳✳✳✳————————————————
Optimization requested. Calculate all possible solution.
1 th solution of sheet MAXIMIZE PROFIT was calculated.
2 th solution of sheet MAXIMIZE PROFIT was calculated.
3 th solution of sheet MAXIMIZE PROFIT was calculated.
4 th solution of sheet MAXIMIZE PROFIT was calculated.
5 th solution of sheet MAXIMIZE PROFIT was calculated.
6 th solution of sheet MAXIMIZE PROFIT was calculated.
6 candidate was calculated.
Maximize variable PROFIT
Number of candidate was limited to 1
Following variable are determined.
Value of variable (REQUESTED DELIVERY PERIOD) is 2
Value of variable (HANDLING) is 1
Value of variable (MARKET CANDIDATE) is MARKET5
Value of variable (QUOTATION) is 1253

Following variable are determined.
Value of variable (REQUESTED DELIVERY PERIOD) is 2
Value of variable (HANDLING) is 1
Value of variable (MARKET CANDIDATE) is MARKET 5
Value of variable (QUOTATION) is 1253
Value of variable (SALES) is 313250
Value of variable (TRANSPORTATION CHARGE) is 15500
Value of variable (PROFIT) is 297750
Execute sheet set MARKET QUOTATION success.
Results are follows...
Value of variable (INPUT COMMODITY) is 297750
Value of variable (INPUT WEIGHT) is 250
Value of variable (REQUESTED DELIVERY PERIOD) is 2
Value of variable (HANDLING) is 1
Value of variable (MARKET CANDIDATE) is MARKET 5
Value of variable (QUOTATION) is 1253
Value of variable (SALES) is 313250
Value of variable (TRANSPORTATION CHARGE) is 15500
Value of variable (PROFIT) is 297750

FIG. 28

| MARKET QUOTATION | |
|---|---|
| INPUT COMMODITY | GRAPE |
| INPUT WEIGHT | 250 (kg) |
| REQUESTED DELIVERY PERIOD | |
| HANDLING | |
| MARKET | |
| QUOTATION | (per kg) |
| SALES | |
| TRANSPORTATION CHARGE | |
| PROFIT | |

INPUT FIELD: GRAPE, 250 Kg, SET

RESET  MENU  EXECUTE  SET & EXECUTE

FIG. 29

| MARKET QUOTATION | |
|---|---|
| INPUT COMMODITY | GRAPE |
| INPUT WEIGHT | 250 (kg) |
| REQUESTED DELIVERY PERIOD | 2 |
| HANDLING | 1 |
| MARKET | MARKET 5 |
| QUOTATION | 1,253 (per kg) |
| SALES | 313,250 |
| TRANSPORTATION CHARGE | 15,500 |
| PROFIT | 297,750 |

INPUT FIELD: GRAPE, 250 Kg, SET

RESET  MENU  EXECUTE  SET & EXECUTE

F I G. 3 1

(A)

| VALUE SET: HOME DELIBERY DIVISION |
|---|
| GENERAL |
| CHILD |

(B)

| DESIGN VARIABLE | I/O | TYPE | VALUE CALCULATED METHOD |
|---|---|---|---|
| HOME DELIBERY DIVISION | INPUT | CHAR | set of HOME DELIBERY DIVISION |
| DIVISION CONDITION | LOCAL | COND | HOME DELIBERY DIVISION = GENERAL |
| WEIGHT | INPUT | NUME | |
| WEIGHT CHARGE | OUTPUT | NUME | select WEIGHT CHARGE from WEIGHT CHARGE TABLE using WEIGHT |

(C)

| DESIGN VARIABLE | I/O | TYPE | VALUE CALCULATED METHOD |
|---|---|---|---|
| WEIGHT | INPUT | NUME | |
| TEMPORARY CHARGE | LOCAL | NUME | select WEIGHT CHARGE from WEIGHT CHARGE TABLE using WEIGHT |
| WEIGHT CHARGE | OUTPUT | NUME | TEMPORARY CHARGE + 500 |

INTERACTIVELY BUILDING AND EXECUTING KNOWLEDGE BASE SYSTEM WITH KNOWLEDGE VARIABLES

BACKGROUND OF THE INVENTION

1. Field of the Invention

The present invention relates to a knowledge base system for building and executing a knowledge base and, more particularly, to a knowledge base system in which an operation based on standardized industrial knowledge is realized by a computer system. Furthermore, the present invention relates to a knowledge base system for building a knowledge base by using a computer and, more particularly, business such as a designer builds industrial knowledge as a knowledge base and maintains the knowledge base. The present invention also relates to a knowledge base system for performing an operation for supporting a business decision on the basis of a predetermined knowledge base.

Industrial knowledge serving as targets of a knowledge base system according to the present invention correspond to knowledge related to various designs such as a machine design, estimation, cost estimation, placement/receipt of order, expediting, delivery of commodities, demand, schedule management, arrangement problems, transportation routes, and various layouts.

More specifically, for example, a knowledge base is constituted by knowledge "spring deflection can be calculated by dividing a load by a spring constant,"knowledge "spring constants classified by predetermined spring types," and the like. A load change in each operation (design), in response to an input of a load, the computer is output a spring type for maximizing the spring deflection by executing the knowledge base. In this manner, the present invention relates to the following knowledge base. That is, a person having industrial knowledge builds the knowledge base by herself/himself, and even a person who does not have the industrial knowledge executes the knowledge base to be able to make decision like the person who has the industrial knowledge.

The present invention relates, in particular, to a knowledge engineering tool with respect to a point that the present invention supports an operation executed by a designer herself/himself who develops a knowledge base system related to the knowledge of the designer who designs products.

2. Description of the Related Art

Conventionally, In order to build a business knowledge base and to design an automated system by using a computer, a program must be formed on the basis of industrial knowledge. In general, the following procedure is used. That is, a person having industrial knowledge forms a large number of documents on the basis of the industrial knowledge, and a program developer forms a program.

However, in this related art, a person having the industrial knowledge can rarely form the program by herself/himself. For this reason, long time and an enormous amount of cost are required to form a program for building the knowledge base. In addition, in order to change the program, which is temporarily formed, an enormous amount of effort and long time are disadvantageously required to form the same documents and to change the program.

Furthermore, in order to build a knowledge base, a programmer must learn the special knowledge. With respect to this point, an enormous amount of effort and long time are disadvantageously required.

In addition, knowledge which must be systemized is often complicatedly related to a plurality of items, and if description sequence of programs in a general procedural program language is erroneous, a correct result cannot be obtained. For this reason, in order to correctly reflect the sequence of calculations of the plurality of items on programs, considerably complex operations must be disadvantageously performed. In addition, since such programs tend to be degraded in readability, a modification, change, or the like of programs based on industrial knowledge which is temporarily built cannot be easily performed disadvantageously.

SUMMARY OF THE INVENTION

An object of the present invention is to provide a knowledge base system which can build a computer system for executing the knowledge base without considering execution sequence of the knowledge base, and can execute the knowledge base in a correct sequence for the relationship among items of the knowledge base.

A knowledge base system according to the present invention in which a knowledge base is formed by a computer and executed by another computer, the knowledge base system comprises knowledge base executing apparatus for executing the knowledge base, and knowledge base building apparatus for building the knowledge base.

The knowledge base building apparatus comprises interface means for receiving the knowledge base by a user, and the interface means comprises a knowledge sheet. This knowledge sheet is, for example, spreadsheet-type editing means, the means comprise a field for storing an output knowledge variable, input and local fields for storing knowledge variables for operating the output knowledge variable, and a field for storing a computing equation of declarative representation that operations of these knowledge variables using another input or local knowledge variable as an operand. These knowledge variables have corresponding operations, respectively.

The knowledge base building apparatus further comprises program generating means for generating from the knowledge sheet, and the program generating means comprises means for translating a computing equation of declarative representation for generating a computer program into a program, and means for generating the attributes of the knowledge variables in the knowledge sheet.

On the other hand, the knowledge base executing apparatus comprises means for retrieving dependence of the output knowledge variable on the another knowledge variables using name of the knowledge variables, means for setting execution sequence of the programs with reference to the dependency and the attributes of the knowledge variables, and means for making an input request to a user or executing the program with reference to the execution sequence.

In the present invention, in building of the knowledge base, sequence of computer program concerning the knowledge variables is not specified in knowledge sheet. For this reason, a person who builds knowledge base can build a knowledge base by inputting knowledge variables and operations to knowledge sheet without considering operation sequence. On the other hand, the knowledge base executing apparatus set the operation sequence in accordance with the names and attributes of the knowledge variables to execute the knowledge base.

In operation of area, as an example, an area can be calculated by "depth"ד width". A person who has the area calculating method as industrial knowledge inputs knowledge variables, i.e., "depth", "width", and "area" and defines the operations of these knowledge variables. For example, the operation of the knowledge variable "depth" is determined as "input", and the operation of the knowledge variable "width" is a predetermined value "10". In this case, the operation of the output knowledge variable "area" is given by "depth" (serving as input knowledge variable)× "width" (10). The "depth" ×"width" is a computing equation of declarative representation. In the computing equation for output knowledge variable of "depth"×"width", the operation is using the another knowledge variables of "depth" and "width". The "depth" and "width" are operand in the computing equation for output knowledge variable.

Even in such a simple example, procedural execution sequence is limited, i.e.; the operation of the knowledge variable "area" must be executed after the knowledge variable "depth" is input. In the present invention, a knowledge base system is built without inputting execution sequence, the system request only computing equation defined by the operation relationship between the methods of calculating the value of each knowledge variable and another knowledge variable.

It is industrial knowledge itself that an area can be operated by "depth"×"width". For this reason, this knowledge is input such that the relationship between a knowledge variable and another knowledge variable for deriving the knowledge variable is expressed as an operation, thereby completing building of a knowledge base. Therefore, according to the present invention, a knowledge base can be built by the minimum effort of a person in charge of business. The operation is expressed by various computing equations which can be executed by an ordinary computer program, e.g., in addition to numerical computation, logical computation, selection, condition, and optimization.

In the present invention, when a knowledge sheet is input to knowledge base interface means, program generating means generates the attribute of a knowledge variable and translates an computing equation into a program. The attribute of knowledge variable is the name of the corresponding knowledge variable, information "operated/non-operated" referred in execution, or information representing that a special operation such as selection, condition, or optimization. On the other hand, a computing equation of each knowledge variable is translated into a program having a format which can be executed by a computer.

In a knowledge base system for executing a knowledge base, for example, an apparatus for executing knowledge base which is operated with a computer, execution sequence specifying means specifies execution sequence of computer programs concerning the knowledge base by dependency of knowledge variables and attributes. For this reason, depending on the type of a knowledge variable, execution sequence is automatically determined. For example, the execution sequence setting means executes a program of the latest output item on the basis of the attribute. When a non-operated knowledge variable appears during the execution, the execution sequence setting means executes a program of a knowledge variable name serving as the corresponding operand. For this reason, when the knowledge variable used in the operation of the latest output item is not operated, the non-operated knowledge variable is operated. In addition, if there is a non-operated knowledge variable in the non-operated knowledge variables, a program for the knowledge variable is executed, and operations required for the latest output item are sequentially executed.

As an embodiment of such a knowledge base system, an embodiment for specifying execution sequence on the apparatus for executing knowledge base during execution, an embodiment for specifying execution sequence on the knowledge base building means before execution, and an embodiment for building a local knowledge base on the knowledge base building means and specifying execution sequence on the apparatus for executing knowledge base are known.

The embodiment for specifying execution sequence on the apparatus for executing knowledge base in advance comprises means for forming a program based on a knowledge base and means for receiving a knowledge base by a user. This interface means comprises a field for storing an output knowledge variable, input and local fields for storing knowledge variables for operating the output knowledge variable, and a field for storing a computing equation of declarative representation. That operations or conditions of these knowledge variables use another input or local knowledge variable as an operand. The program generating means comprises means for translating a computing equation of declarative representation into programs, means for retrieving dependency among knowledge variables used until the output knowledge variable is operated, and means for setting execution sequence of the programs for instructing an input request and computation with reference to the dependency.

More specifically, for example, a knowledge variable for operating an output item used in an operation procedure for a knowledge variable serving as an output target is specified, and knowledge variables used in the operation procedure for the knowledge variable for operating the output item are sequentially specified. The dependency of the knowledge variables is subjected to retrospection until the operation procedure of the knowledge variables sequentially specified is input, and a knowledge variable serving as an input target required for an output item operation is specified. The input request process is used as a start process, and operation sequence is specified in reverse sequence of the retrospective sequence.

In this embodiment, when a knowledge base is input, the knowledge base can be input without considering execution sequence, and a program which can be executed by a computer is automatically generated. For this reason, the knowledge base can be easily built. In this case, a knowledge base system can be easily built without specifying any environment on the execution side.

In an embodiment in which execution sequence is specified on the apparatus for executing knowledge base during execution, the apparatus for executing knowledge base comprises means for executing a knowledge base and knowledge base storing means which stores the knowledge base. The knowledge base has an output knowledge variable, a knowledge variable for operating the output knowledge variable, and a computing equation declaratively represented such that the operations or conditions of these knowledge variables use another input or local knowledge variable as an operand. The means for executing knowledge base comprises means for translating the declaratively represented computing equation into programs, means for retrieving dependency among knowledge variables used until the output knowledge variable is operated, means for setting execution sequence of the programs with reference to the dependency, and means for making an input request to a user or executing the programs with reference to the execution sequence.

As a manner of specifying execution sequence, for example, the following manner is used. That is, it is checked whether a knowledge variable having an output attribute can be computed. If there is a non-operated knowledge variable, inquiry is issued to the knowledge base storing means. This procedure is repeated.

In this case, the contents of knowledge base information need not be fixed until programs are executed. Even if the knowledge base information such as price information of commodities must be updated at a predetermined period, updating the knowledge base information can support decision on business based on the latest information.

In an embodiment in which the knowledge base building means builds a local program, when an interpreter for executing the local program is installed in the apparatus for executing knowledge base, any types of computers can be used as apparatuses for executing knowledge base.

As described above, according to the present invention, in any case, when an operation in which methods of calculating the values of knowledge variables are defined by computing relationship between the knowledge variables and another knowledge variable is only input, a knowledge base is built without inputting sequence on execution. For this reason, when a person who builds knowledge base inputs knowledge variables and operations thereof, the knowledge base can be built without considering actual execution sequence, therefore, without detailed knowledge for building programs.

On the other hand, when a knowledge base is to be executed, the knowledge base executing means sequentially specifies execution sequence on the basis of dependency among knowledge variables and operations thereof. For this reason, even the knowledge base in which execution sequence has not been determined in advance can be preferably executed. In addition, since knowledge variables and operations constitute a knowledge sheet thereof, maintenance or modification after the fact can be easily performed. Therefore, a person who has industrial knowledge can systemize the industrial knowledge by herself/himself.

BRIEF DESCRIPTION OF THE DRAWINGS

FIG. 2 is view for explaining a knowledge sheet input to the knowledge base interface means shown in FIG. 1.

FIG. 3 is a view showing information generated by the program generating means shown in FIG. 1, in which FIG. 3A shows a program and FIG. 3B is a view for explaining attributes.

FIG. 7 is a view for explaining a knowledge table and a knowledge sheet using the knowledge table, in which FIG. 7A is a view for explaining a knowledge table of "spring type table" and FIG. 7B is a view for explaining a knowledge sheet of "spring selection".

FIG. 8 is a view for explaining a knowledge table having two table condition items.

FIG. 9 is a view for explaining the attribute of a knowledge table generated by the program generating means shown in FIG. 1 on the basis of the knowledge table shown in FIG. 7A.

FIG. 10 is a view for explaining a program generated by the program generating means shown in FIG. 1 on the basis of the knowledge table shown in FIG. 7A.

FIG. 11 is a view for explaining the attribute of a knowledge sheet generated by the program generating means shown in FIG. 1 on the basis of the knowledge sheet shown in FIG. 7A.

FIG. 12 is a view for explaining a language used in a program generated by the program generating means shown in FIG. 1.

FIG. 13 is a view for explaining a program of the knowledge sheet shown in FIG. 7B and generated by the program generating means shown in FIG. 1.

FIG. 16 is a view for explaining a knowledge sheet according to an embodiment of the present invention.

FIG. 17 is a view illustrating a commodity table referred from the knowledge sheet shown in FIG. 16.

FIG. 18 is a view illustrating a market candidate referred from the knowledge sheet shown in FIG. 16.

FIG. 19 is a view illustrating quotation table 2 (delivery period) referred from the knowledge sheet shown in FIG. 16.

FIG. 20 is a view illustrating quotation table 2 (distance) referred from the knowledge sheet shown in FIG. 16.

FIG. 21 is a view illustrating quotation table 2 (quotation) referred from the knowledge sheet shown in FIG. 16.

FIG. 22 is a view illustrating a transportation charge table referred from the knowledge sheet shown in FIG. 16.

FIG. 23 is a view illustrating an additional charge table referred from the knowledge sheet shown in FIG. 16.

FIG. 24 is a view illustrating generation of an attribute by execution of the knowledge sheet shown in FIG. 16.

FIG. 25 is a view for explaining an input request of an input commodity.

FIG. 26 is a view for explaining an input request of an input weight.

FIG. 27 is a view for explaining execution results of the knowledge sheet shown in FIG. 16.

FIG. 28 is a view for explaining communication with spreadsheet software.

FIG. 29 is a view for explaining execution results of the example shown in FIG. 28.

FIG. 31A is a view showing a set of values,

FIG. 31B is a view showing "operation by weight" shown FIG. 30, and

FIG. 31C is a view showing "operation by weight (solution 2)".

DETAILED DESCRIPTION OF THE PREFERRED EMBODIMENTS

Figure 1:
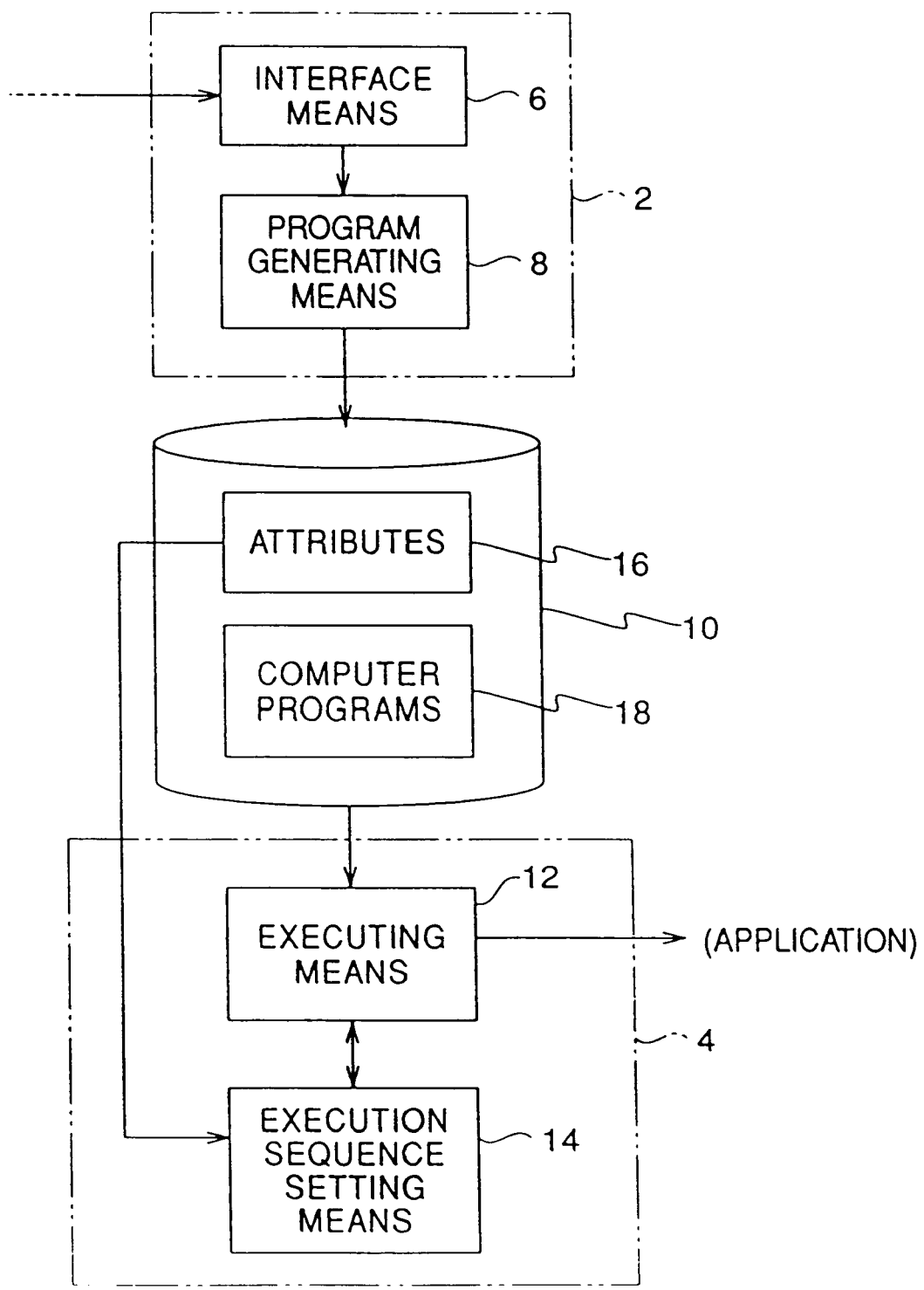
FIG. 1 is a block diagram showing the arrangement of a knowledge base system according to an embodiment of the present invention.

An embodiment of the present invention will be described below with reference to the accompanying drawings. According to an embodiment of the present invention, in inputting a knowledge base, when an industrial knowledge represented as dependency of a knowledge variable without considering any execution sequence of the knowledge base to make it possible to build the knowledge base. In addition, dependency among the knowledge variables of the knowledge base is retrieved, and the execution sequence of the knowledge base built as described above is executed with reference to the dependency. Therefore, a person who has industrial knowledge can systemize the knowledge base without special knowledge for building program and effort.

The knowledge base system according to the embodiment will be described below with reference to FIGS. 1 to 15. Referring to FIGS. 1 to 4, knowledge for operating a volume is built as a knowledge base, and the knowledge base is executed. More specifically, the following knowledge is systemized. That is, "depth" and "width" are input to calculate "area", and "volume" is calculated by inputting "height" and the calculated "area". An actual example is applied to various fields, and various knowledge variables are used as output targets. Several examples will be described below. The example of a volume shown in FIGS. 1 to 4 is only illustrated to make it easy to explain the present invention. The example does not limit the application fields of the present invention.

A knowledge base system according to this embodiment comprises a knowledge base building apparatus 2 for building a knowledge base, and a knowledge base executing apparatus 4 for executing the knowledge base built by the knowledge base building apparatus 2. Furthermore, the knowledge base building apparatus 2 comprises a knowledge base interface means 6 which receives a knowledge base by a user, and a program generating means 8 for generating computer programs on the basis of the knowledge base input to the knowledge base interface means 6.

The knowledge base interface means 6, as shown in FIG. 2, further comprises a knowledge sheet 20 having fields. In the fields of the knowledge sheet, an output knowledge variable 26 serving as an externally output target, input and local knowledge variables 30a, 30b and 30c and 28 for deriving the output knowledge variable 26, and an operation 32a, 32b, 32c, 32d and 32e obtained such that methods of calculating the values of the knowledge variables 26, 28, and 30 are declaratively represented by using another knowledge variable as an operand.

The knowledge base building apparatus 2 can execute a program for building knowledge base by installing the program in a generally available computer. Similarly, the knowledge base executing apparatus 4 can execute a program for building knowledge base by installing the program in a generally available computer. Although these apparatuses are generally independent, the programs may be installed in the same computer. A person who has industrial knowledge uses the knowledge base building apparatus and a person who has no industrial knowledge uses the knowledge base executing apparatus.

In the example in FIG. 2, the output knowledge variable 26 serving as a goal is "volume", the local knowledge variable 28 is "area", and the input knowledge variables 30 are "height", "depth", and "width". The operation of the knowledge variable "volume" is "area×height", the operation of the knowledge variable "area" is "depth×width", and an alternative operation is an input request. The plurality of knowledge variables and operations are input as the knowledge sheet 20. As interfaces for inputting the variables and operations, various interfaces can be used. A spreadsheet-type input, an input of a text with tabs, commas, and the like, or an input of a text with a control code may be used. In the example shown in FIG. 2, although one operation is defined to one knowledge variable, a plurality of operations may be input, and one operation may be selected from these operations during execution.

The program generating means 8, as shown in FIG. 3, generates attributes 24 related to the knowledge variables 26, 28, 30 in the knowledge sheet, and comprises a sheet translating function for translating the operation 32 into the computer program 22. As the program 22, shown in FIG. 3A, can be used in the computer that a program which can be executed by an interpreter, a program which is described by the machine language and can be directly executed by the executing means, or a program which can be compiled by a compiler. As another program, a program which can be easily further changed can be used. For example, a program described by reverse Polish notation is a description which can be executed by the interpreter of the executing means 12.

The attributes 24, for example, as shown in FIG. 3B, is constituted by a knowledge variable name, an attribute of operated/non-operated, and designation of input/output. The attributes are used to specify execution sequence of the programs 22 of knowledge variables.

In addition, the knowledge base executing apparatus 4 comprises an execution sequence setting means 14 for specifying execution sequence of programs on the basis of the attributes 24 generated by the sheet translating function, and an executing means 12 for sequentially executing the programs on the basis of the execution sequence specified by the execution sequence setting means 14.

Depending on the embodiment, the execution sequence setting means 14 comprises an operation state attribute managing function for managing attributes of operated/non-operated by using the attributes 24 every knowledge variables 26, 28, and 30, and a non-operated knowledge variable priority executing function for carrying up, when there is a knowledge variable which is not operated by the operation state attribute management function when the programs 22 is computed by the executing means 12, the execution sequence of the program of the non-operated knowledge variable.

In addition, the execution sequence setting means 14 comprises an input request control function for controlling, when a method of calculating the value of the non-operated knowledge variable executed by the non-operated knowledge variable priority executing function is not defined in the knowledge sheet, the value of the non-operated knowledge variable to input the value.

Figure 4:
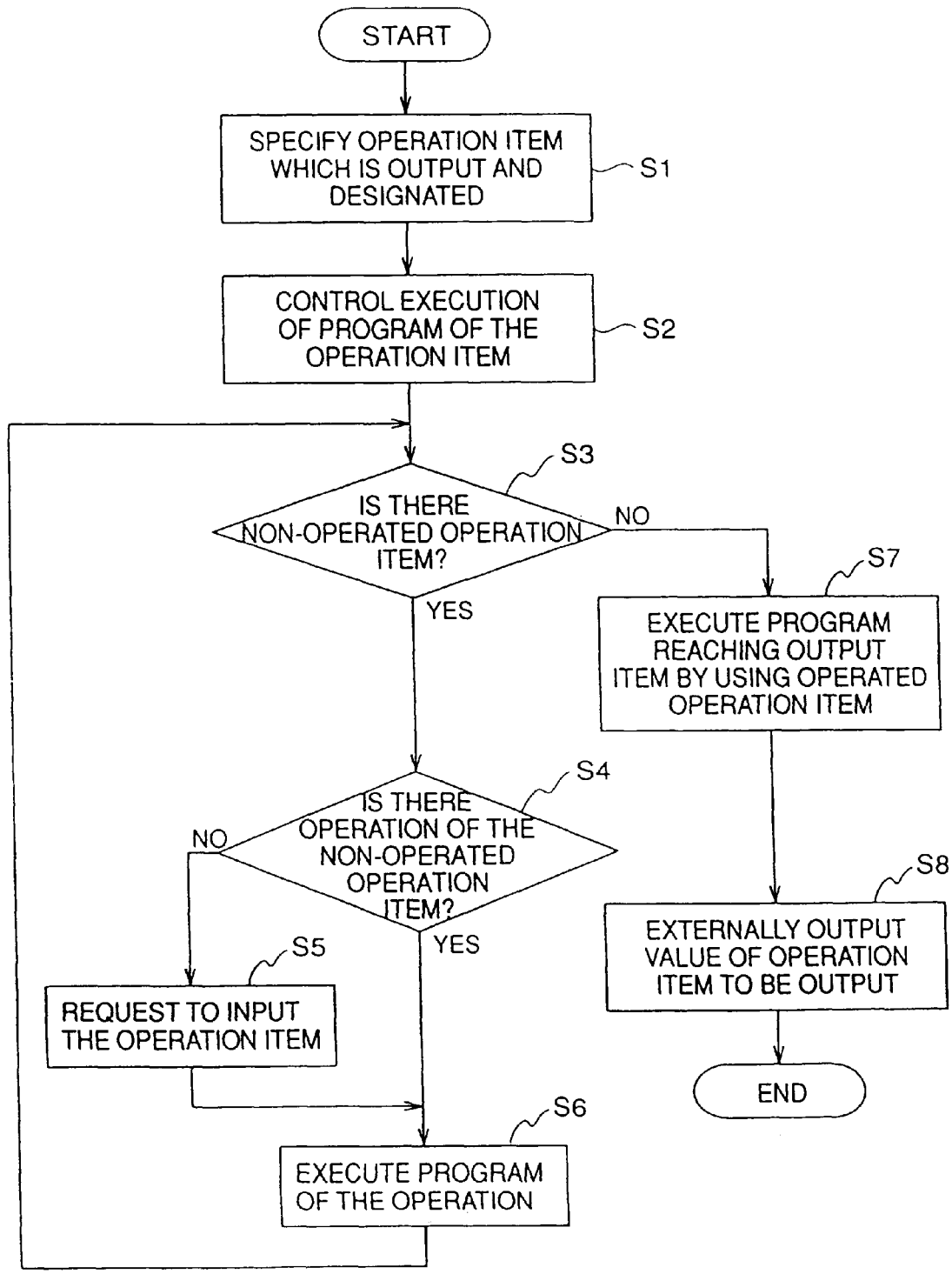
FIG. 4 is a flow chart showing an operation in the arrangement shown in FIG. 1.

FIG. 4 is a flow chart showing an operation of the knowledge base executing apparatus having the arrangement shown in FIGS. 1 to 3. As shown in FIG. 4, the execution sequence setting means 14 reads an output and designated knowledge variable (operation item) from the attributes 24 to specify the knowledge variable (step S1). In the example shown in FIG. 3, the knowledge variable name "volume" is specified. The execution sequence setting means 14 performs control to execute the program 22 obtained by translating an operation of the knowledge variable (in this case, "volume") specified in step S1 (step S2). At this time, it is checked whether a non-operated knowledge variable is included in knowledge variables which are required to execute the programs (step S3). In the example shown in FIG. 3, according to the attributes 24, since the value of "area" is non-operated, the process in step S4 is performed.

In step S4, it is checked whether there is an operation of the knowledge variable "area" which is not operated. In this case, since there is a program defined as "depth×width", the flow shifts to step S6 to execute the program of the "area". In this case, since the knowledge variables "depth" and "width" are not operated, the flow shifts to step S4 through step S3. An operation of the knowledge variable "depth" is not defined, and "input" is set. For this reason, the knowledge variable "depth" is requested to be input (step S5). Similarly, the knowledge variable "width" is also input. In this manner, the program of the knowledge variable "area" is executed (step S6), and the process returns to the operation of "volume".

In the program of the volume, since "height" is designated to be input, a non-operated knowledge variable has no operation, and the "height" is requested to be input. When the "height" is input, there is no non-operated knowledge variable (step S3). For this reason, a program to obtain an output item "volume" is executed by using the operated knowledge variable (step S7). When the knowledge variable "volume" is operated, the value of the "volume" is output outside (step S8) to end the process.

As described above, even in a knowledge base in which any execution sequence is not defined, required processes are sequentially specified on the basis of dependency among knowledge variables and then executed. For this reason, execution sequence need not be input when the knowledge base is input, and a person in charge of business who has no knowledge for building program can easily build a knowledge base. In addition, since a knowledge base is built in such a state that a knowledge sheet can be easily read. When industrial knowledge or decision is changed, the knowledge base can be modified or changed with a small amount of effort within a short time. Even if another knowledge base is to be built by using a knowledge base which is temporarily built, when only dependency among now knowledge variables is defined, and only input/output are changed, a new knowledge base can be built. In the method according to the present invention, extension and change of a system can be performed easier than in a method in which all the execution procedures of programs are changed. These advantages are effective for a person who has knowledge for building program, because the person need not consider specifying of execution sequence.

Figure 5:
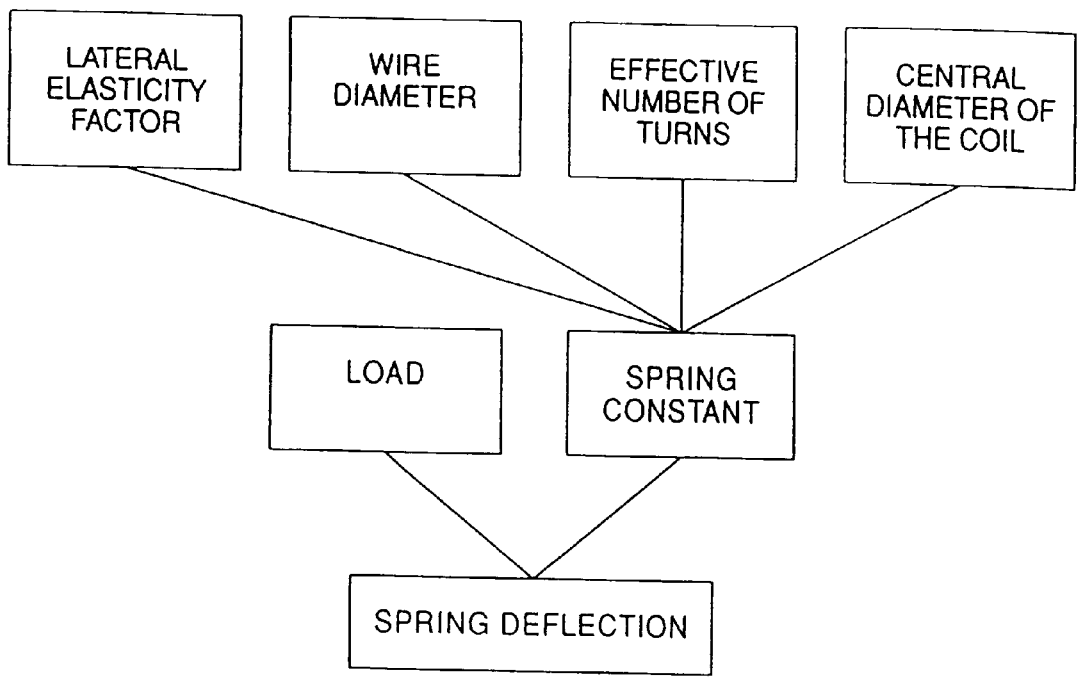
FIG. 5 is a view for explaining dependency among knowledge variables.
Figure 6:
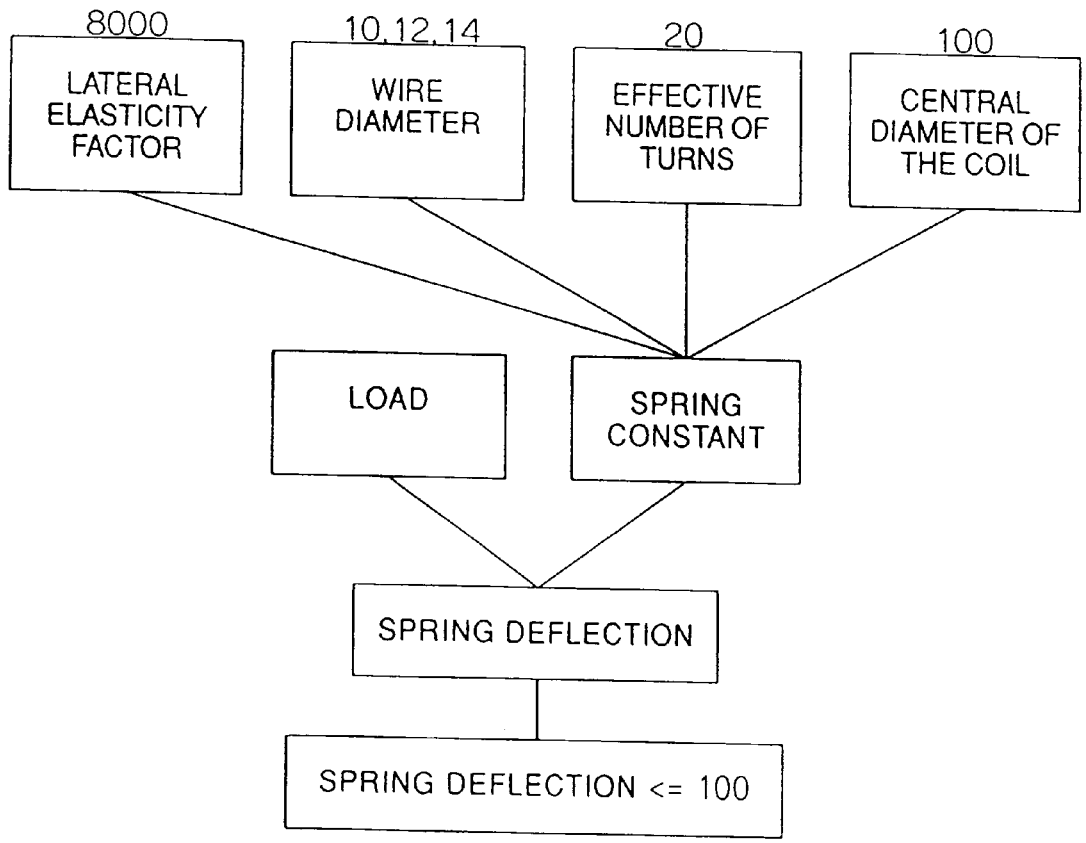
FIG. 6 is a view for explaining dependency obtained by adding knowledge conditions to the dependency shown in FIG. 5.

FIG. 5 is a view for explaining dependency among knowledge variables. In the example shown in FIG. 5, the relationships among other knowledge variables for deriving a knowledge variable "spring deflection" are shown. The "spring deflection" depends on "load and spring constant".

More specifically, spring deflection=load/spring constant. The spring constant depends on "lateral elasticity factor", "wire diameter", "effective number of turns", and "central diameter of the coil". That is, the following equation is established:

spring constant=(lateral elasticity factor×wire diameter 4)/(8×central diameter of the coil 3).

When a designer who has an industrial knowledge (design knowledge) for obtaining the "spring deflection" builds a knowledge base on the basis of the design knowledge for obtaining the spring deflection, the knowledge variables shown in FIG. 5 and operations of "spring deflection" and "spring constant" may be input to the knowledge base interface means 6 without specifying any execution procedure.

When the dependency shown in FIG. 5 is established, a knowledge base having "wire diameter" as an output item can also be built. The values of other knowledge variables have been determined in advance by using the knowledge variables "wire diameter" and "load" as output and input items, the "wire diameter" obtained when the load is input is output. In this manner, in this embodiment, a knowledge base system can be easily modified by only changing input/output to knowledge variables or values thereto.

In order to support decision on business, the decision must be made under not only knowledge represented by all unique equations as described above but also various limits. For example, when a building is to be designed, limits defined by various rules, and the design must be performed under these limits. In addition, when fruits are to be delivered, the number of days which can be used for delivery depends on the types of fruits may be limited. When machine design is to be performed, since there are three types of springs, the type of the corresponding spring may have to be selected from these types of springs. Furthermore, when a shipping market is determined, a market where maximum profit can be obtained must be selected.

In order to build a knowledge base on the basis of the industrial knowledge, in the embodiment shown in FIGS. 6 to 14, "selections", "conditions", and "optimization" are introduced. In the example shown in FIG. 6, assume that a lateral elasticity factor 8000 is set to be a fixed value and that a spring deflection is set to be 100 or less. Under the conditions, when a load is used as an input item, a spring having one of wire diameters of "10, 12, 14" is selected. In this case, the wire diameter 100 or number of turns 20 of the wire is changed until the condition that the spring deflection is 100 or less is satisfied to execute the knowledge base. Even in this case, in this embodiment, a knowledge base can be built without specifying any execution sequence.

Assume that the type of spring has been determined in advance and that a spring constant has been determined to each spring. In this case, the type and the spring constant can be represented as a table, a knowledge base can be very easily built. FIG. 7A is a view for explaining industrial knowledge represented by such a table. In an embodiment which handles the knowledge table, a knowledge base interface means 6 comprises a knowledge table input function in which a table output item 36 specified by one or more table input condition 34 is input in the table format constituted by the table input condition 34 and the table output item 36, and a table reference item input function in which specification of a value for referring to a knowledge table 38 input by the knowledge table input function is input as an operation.

A program generating means 8 has a table translating function for translating the knowledge table input by the knowledge table input function into a program constituted by a plurality of conditional decision sentences such as if sentences classified by table input conditions. In addition, an execution sequence setting means 14 comprises a table reference control function for controlling a program translated by the table translating function to execute the program when a table reference knowledge variable input by the table reference knowledge variable input function is computed.

In the example shown in FIG. 7A, when a spring type is determined, the "spring constant" of the "spring type" is specified. As described above, in this embodiment, various standard tables can be directly input as knowledge tables. The knowledge tables are translated into programs 18 constituted by a plurality of conditional decision sentences.

More specifically, in the example shown in FIG. 7, a value specified when a knowledge variable input by the table reference item input function is executed is compared with the values of the table input conditions 34. If the values are equal to each other, values of table output items 46 of the table input conditions 34 are sent back. If the values are different from each other, a program for executing other table input conditions 34 are formed for all the table input conditions 34.

FIG. 8 is a view for explaining a knowledge table having two types of table input conditions. In the table shown in FIG. 8, the table input conditions 34 are "pressure" and "temperature", and the table output item 36 is a water compressibility. The solid line in FIG. 8 means a case wherein the "water compressibility" is $4.58 \times 10^{-5}$ at a temperature of 10 and a pressure of 50 or more and lower than 75. In general, in order to form a program on the basis of such knowledge, conditional decision sentences such as if sentences must be frequently used. However, in this embodiment, the knowledge table is automatically translated into a program constituted by a plurality of conditional decision sentences such as if sentences. In this case, a program generating means 8 generates a program for checking whether the pressure is within a predetermined range and generates a program for sending back values which satisfy the two table input conditions 34, i.e., the pressure and the temperature.

The program generating means 8 generates attributes 16 with respect to the knowledge table 38, and the execution sequence setting means 14 specifies execution sequence of the knowledge table 38 on the basis of the attributes 16 related to the knowledge table 38.

Handling of conditions on knowledge base execution will be described below. As knowledge conditions, for example, "spring deflection is 100 or less" with respect to machine design, limit of a ratio of building volume to lot with respect to architecture design, limit of the number of days with respect to a delivery system, or limit of the maximum size of a layout or a minimum character size with respect to the layout system of a New Year's card is used. In these cases, since a knowledge base for supporting decision on business cannot be built by a simple computation, knowledge conditions are introduced to the knowledge base. Knowledge variables for giving the knowledge conditions can be set to not only items to be output but also local items.

In this example, the knowledge base interface means 6 comprises a condition input function for receiving, as operations, conditions on knowledge with respect to knowledge variables in the knowledge sheet. In addition, the execution sequence setting means 14 comprises a condition item priority processing function for giving, when knowledge conditions are input to condition knowledge variables as operations by the condition input function, priority to the sequence of computation of the conditional knowledge variables over computation of output items, an output item execution control function for executing, when operation results of condition knowledge variables executed and controlled by the condition item priority processing function satisfy the knowledge conditions, computation of the output items, and a failure end control function which determines failure of the operation to end the execution when the operation results of the condition knowledge variables do not satisfy the knowledge conditions.

When the condition knowledge variables are input by the condition input function, the program generating means displays, in the attributes 16, that conditions are given to the knowledge variables. The execution sequence setting means 14 preferably executes knowledge variables with knowledge conditions on the basis of information recorded in the attributes 16.

In this embodiment, when the condition knowledge variables do not satisfy knowledge variables, the process is ended by the failure end control function. A point where the knowledge variables are not satisfied by values input with respect to the input knowledge variables is output during execution. Prior to computation of output items, the knowledge variables with knowledge conditions are computed. For this reason, a disadvantage that an output is performed by the values which do not satisfy the knowledge conditions does not occur. Since the execution sequence is specified as described above, building of a knowledge base with knowledge conditions can be input without considering execution sequence.

Depending on building of a knowledge base, when a plurality of predetermined items are selected, complex industrial knowledge may be required. For example, selection of parts on design such as selection of wire diameters shown in FIG. 6 or selection of routes in searching for routes of a pipeline is used. This selection can be realized by the following various input methods. A plurality of selection targets are represented by increasing/decreasing a numerical value at predetermined intervals from an initial value to a final value, as shown in FIG. 7, types of parts are represented as a table to input a plurality of selection targets, and the selection targets are described as operations. Selection of selections is defined by relationship between the selections and knowledge conditions. More specifically, this embodiment is to systemize industrial knowledge for selecting a selection which satisfies the knowledge conditions from the plurality of selections.

In the embodiment which handles the selection, the knowledge base interface means 6 comprises a selection input function for receiving selections or an increase/decrease in value as an operation with respect to the values of knowledge variables in the knowledge sheet 20.

The execution sequence setting means 14 comprises a selection selecting control function for sequentially replacing, when there are condition knowledge variables input by a condition input function and when the operation results of the condition knowledge variables do not satisfy the knowledge conditions, selections input by the selection input function to execute computation of the condition knowledge variables again.

In this case, the program generating means 8 records the presence/absence of definition of a selection for each knowledge variable on the attributes. The execution sequence setting means 14 specifies execution sequence on the basis of the presence/absence of selections and the presence/absence of knowledge conditions.

As described above, the execution sequence setting means 14 selects another selection when the knowledge conditions are not satisfied, selection of a selection which satisfies the knowledge conditions can be executed. For this reason, in building a knowledge base having knowledge conditions and selections, the knowledge base can be built without considering execution sequence.

Depending on the case, optimization should be applied to support for decision on business using a knowledge base. For example, in selection of a market for shipping commodities, a market where the maximum sales can be obtained is selected. In selection of a line of pipes of a pipeline, a line in which the minimum construction cost can be obtained is selected. In addition, in a stock management system, management is desired to be performed at the minimum amount such that some conditions are satisfied. When a member having a length input by combining materials having a plurality of lengths is to be designed, depending on the case, the rest of the materials should be minimized. In order to build such a knowledge base, in this embodiment, a knowledge base for optimizing a certain knowledge variable is built.

In the embodiment in which optimization is performed, the knowledge base interface means 6 comprises an optimization input function for receiving optimization on knowledge to knowledge variables in the knowledge sheet 20 as an operation.

In addition, the execution sequence setting means 14 comprises an all-selection selecting function for selecting, when there is an optimization knowledge variable which is a knowledge variable optimized by the optimization input function, all selections to selection knowledge variables input by the selection input function, and a selection-classified computing function for computing the operation of an optimization item input by the optimization input function for each of the selections selected by the all-selection selecting function.

The execution means further comprises an optimum solution selecting function for outputting a value suitable for an optimization condition as an optimum value on the basis of operation results for the selections computed by the selection-classified computing function.

Since the operation of the optimization item input for each selection by the optimization input function is computed by the selection-classified computation function, a plurality of values serving as a base for selecting an optimum solution, and the optimum solution selecting function outputs, an optimum value, a value suitable for the optimization condition on the basis of the operation result of each selection. For this reason, a knowledge base can be built and executed by only inputting the selection and the optimization condition without considering execution sequence with respect to optimization of the values of knowledge variables.

With reference to the knowledge sheet and knowledge table shown in FIG. 7, an operation of knowledge base system using selections, knowledge conditions, optimization, and a knowledge table will be described below.

Here, as a machine design system, a knowledge base system for selecting a spring having a deflection amount as much as possible from a plurality of predetermined springs under the condition that a deflection is 100 or less with respect to a given load is built and executed.

A description of an operation in this embodiment is defined first. Selections are represented by the follows. That is, "TAKENFROM value 1, value 2" means that value 1 or value 2 is selected, "FOR start value TO end value STEP interval value" means that the value is increased at the interval values until the value designated as the start value reaches the end value. When DOWNTO is used in place of TO, the value is decreased at the interval values.

The knowledge condition is represented by ">, <" representing the magnitude of a value. As the optimization, minimization is defined as "MINIMIZE (knowledge variable name)", and maximization is defined as "MAXIMIZE (knowledge variable name)".

Reference of the knowledge table is represented by the following equation:
"SELECT table output item name FROM knowledge table name USING table condition name, table condition name". This means that an output item designated by a table output item name from a knowledge table designated by a knowledge table name is referred to by using a table condition name. In the example shown in FIG. 8, "SELECT water compressibility FROM water compressibility table USING pressure, temperature" is obtained.

FIG. 7A is a view showing a spring type table which is obtained such that, when there are three types of springs to be selected on design, knowledge is systemized as the knowledge table 38 together with spring constants corresponding to the spring types. FIG. 7B is a view showing a knowledge sheet which receives knowledge for selecting a spring type shown in FIG. 7B under the knowledge condition that the spring deflection is 100 or less while deflection is maximized according to an input load.

As shown in FIG. 7B, since a knowledge variable "load" is an input item, the knowledge variable "load" and designation "input" of input/output are input to the knowledge sheet. Since the "spring deflection" is "load/spring constant", the "spring deflection" is input as a local knowledge variable. The "spring constant" has a value obtained with reference to "spring type table" serving as the knowledge table shown in FIG. 7A, reference is defined by a select sentence. In addition, since a final output target is "spring type", the "spring type" is set as "output", and it is represented by a takenfrom sentence that the "spring type" is a selection. Since "deflection condition" is 100 or less, the "deflection condition" is represented as numerical computation. In order to perform optimization by "deflection maximization", optimization is input. The optimization designates optimization to a local item in the example shown in FIG. 7B.

As shown in FIG. 7B, when only knowledge on business, conditions on design (knowledge conditions), and designation of optimization is input, building of a knowledge base is completed. At this time, the following input related to execution sequence is not required at all. That is, "spring deflection" need not be operated after the table is referred to, or the operation need not be performed by using all the selections to perform optimization.

When the knowledge sheet 20 and the knowledge table 38 are input, the program generating means 8 generates the attributes 16 and the programs 18. Since the information of the knowledge table 38 is used to translate the knowledge sheet 20, the knowledge table 38 is input first in this embodiment.

FIG. 9 is a view for explaining attributes 16a of the knowledge table. On the basis of one knowledge table, a table attribute description, a table input condition description, and a table output item description are formed as the attributes 16a of the knowledge table.

The program generating means 8 forms a table attribute description. The name of a table, the number of conditions, and the number of output items are stored in the table attribute description. Table input condition description for storing condition values serving as inputs to the knowledge table is formed ("spring type name" in the above example). This condition description is referred to when the execution apparatus executes the knowledge table.

Table output item descriptions which are equal to in number the output items set in the knowledge table are formed ("spring constant" in the above example). The names of an output item, a data type, and the like are stored in the table output item descriptions. In the table output item descriptions, output variables are described for output items (0.5, 1.04, 1.92 in the above example). The output variable is formed as a variable which has been operated during execution of the knowledge sheet. A program which refers to the table input condition follows the output variable as a program for operating the value of the output variable. The output variable value of the knowledge table in the example shown in FIG. 9, a Pascal-linguistic description of the decision instruction, and a translated program are shown in FIG. 10.

An example wherein the attributes 16 and the programs 18 are generated from the knowledge sheet 20 will be described below. In order to generate the attributes 16 and the programs 18 from the knowledge sheet 20, the program generating means 8 comprises a condition item list information generating function for generating, as condition item list information, a list of condition knowledge variables which receive a knowledge condition as an operation by the condition input function, and an optimization item list information generating function for generating, as optimization item list information, a list of optimization knowledge variables which receive optimization as an operation by the optimization input function.

According to the above arrangement, the execution sequence setting means 14 comprises a function for computing operation results which satisfy the conditions of all condition knowledge variables specified by the condition item list information when optimization item list information and condition item list information are generated as attributes by the program generating means 8, and a function for computing the optimization knowledge variables when there is at least one operation result which satisfies all the condition knowledge variables.

FIG. 11 is a view for explaining attributes 16b of a knowledge sheet. The attributes 16b of the knowledge sheet have sheet an attribute description and a knowledge variable description. In the sheet attribute description, the name of the knowledge sheet, a list of condition items serving as knowledge conditions, a list of optimization items serving as optimization items, and a list of knowledge variables are stored.

The knowledge variable description is formed. In the knowledge variable description, the status of non-operated/ operated or wait/done, the discrimination of output item, the presence/absence of optimization (OPT.), the discrimination of selection item (SEL.), and a program (PROG.) for value operation are stored. Respective commands for describing computer instructions are shown in FIG. 12, and computer instructions corresponding to FIG. 11 are shown in FIG. 13.

Figure 14:
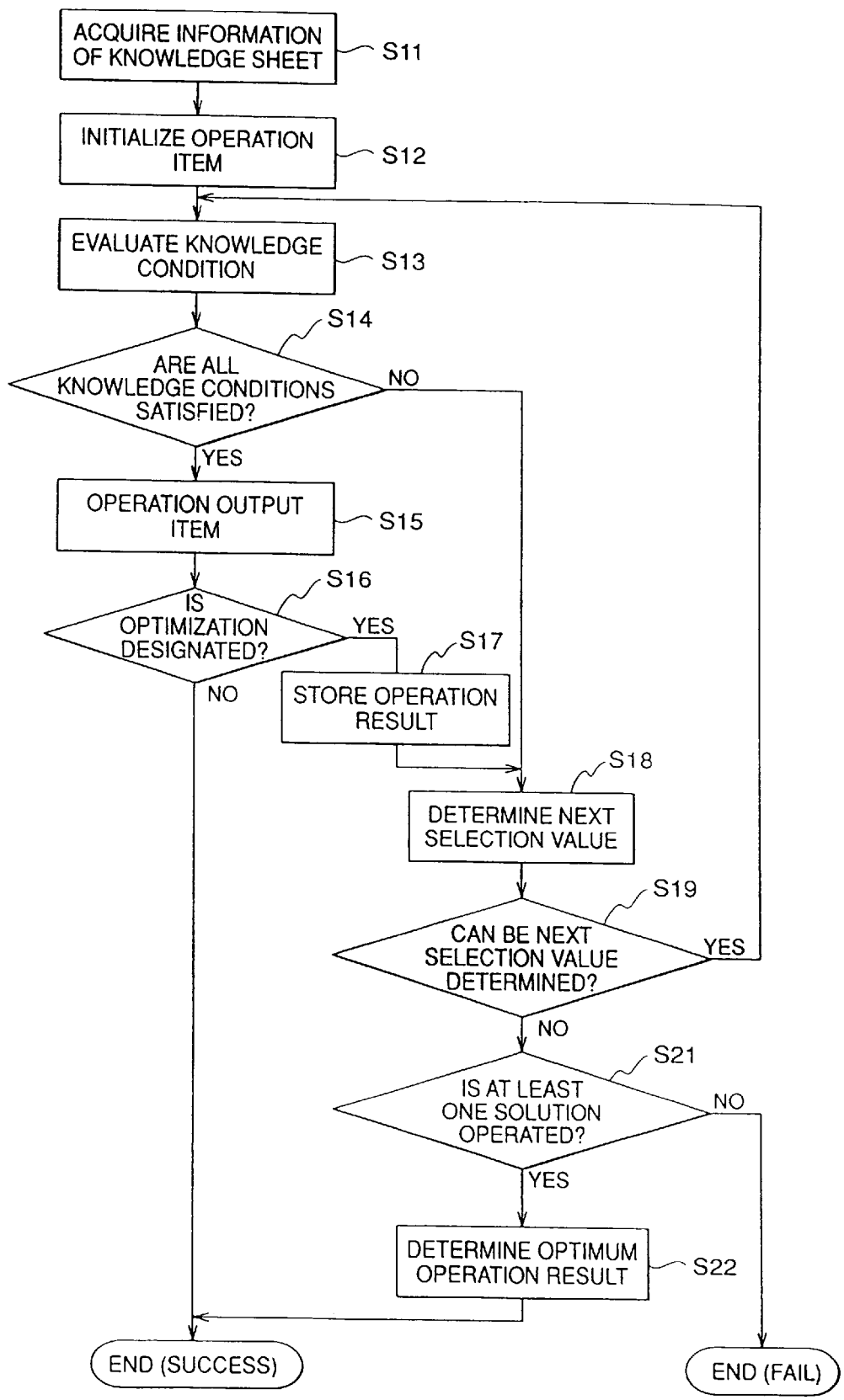
FIG. 14 is a flow chart showing execution of a knowledge base in the example shown in FIG. 7.

Sequential execution processes of the knowledge sheet will be described below with reference to FIG. 14. In the knowledge variable description stored in the sheet attribute description, information of knowledge variables included in the knowledge sheet is stored. On the basis of the information, the data type of knowledge variable, the presence/absence of selection item, and the presence/ absence of optimization are checked (step S11).

When selection items are present on the knowledge sheet, all the selection items (knowledge variables) in the knowledge sheet are initialized, and the first selection item is stored in the knowledge variable description as a value which has been operated (step S12).

"Execution of program" stored in the knowledge variable description with respect to all the knowledge variables stored in the list of the knowledge conditions of the sheet attribute description is performed to check whether the results are true (step S14). If all the results are true, "operation of output item" is performed. When optimization is designated by the knowledge sheet, "storage of operation result" is performed, and "generation of next selection value", "evaluation of knowledge condition", "operation of output variable", and "storage of operation result" are repeated until the next selection result cannot be obtained.

Of the knowledge variables stored in the list of knowledge variables of the sheet attribute description, "execution of program" stored in the knowledge variable description with respect to a knowledge variable designated as an output from the sheet is performed to store the operation result in the knowledge variable description as a value which has been operated (step S15).

When optimization is designated (step S16), all the values stored in a knowledge variable description stored in the list of knowledge variables of the sheet attribute description are stored in a storage area which is temporarily assigned (step S17).

The values of selection items in the knowledge sheet are sequentially changed into a next candidate (steps S18 and S19). In this process, all combinations of the values of selection items in a design sheet are generated.

From all the operation results stored in the storage area which is temporarily assigned, on the basis of knowledge variables designated to be optimized and methods of optimization (maximum, minimum, and arbitrariness of operator), the combination of final operation results is determined. More specifically, it is checked whether at least one solution which satisfies a knowledge condition determined by a plurality of selections in step S14 (step S21). When at least one solution is operated, decision of an optimization operation result is made (step S22), and execution of the knowledge base is determined to be succeeded to end the process. On the other hand, when there is no selection which satisfies the design condition, failure is determined to end the process.

Two or more optimization in step S22 are set, a selection which satisfies the second optimization is selected from a plurality of selections which satisfy the first optimization.

Execution of a program will be described below. The executing apparatus 4 receives control such that when the value of a knowledge variable must be calculated, a program string stored in the knowledge variable description of the item is designated. The executing apparatus 4 sequentially executes the programs.

The programs are constituted by, as shown in FIG. 12, load instructions of the values of the knowledge variables and calculation instructions. Each load instruction of the value is constituted by a load instruction of a variable and a load instruction of a constant. This apparatus refers to the knowledge variable description of a knowledge variable to be loaded when the load instruction of the variable, thereby checking whether the value of the knowledge variable has been operated.

If the value of the knowledge variable has been operated, the value is loaded. If the value of the knowledge variable has not been operated, a program string for calculating the value of the knowledge variable is designated, the apparatus (program executing apparatus) gives control to itself. Execution of the instruction is performed until Fail instruction (failure in operation) or Stop instruction (success in operation) appears.

Execution of the program will be described with reference to an operation of a knowledge condition "condition of deflection" in a knowledge sheet "selection of spring" shown in FIG. 7. The program is shown in FIG. 13.

1) A program string stored in the knowledge variable description of "condition of deflection" is executed.
2) "Deflection of Load spring" is executed. Since the variable "spring deflection" is not operated, the value of the "spring deflection" must be calculated.
3) A program string stored in the knowledge variable description of "spring deflection" is executed.
4) "Load load" is executed. Since a variable "load" is an input value, the value is input.
5) "Load spring constant" is executed. Since a variable "spring constant" is not operated, the value must be calculated.
6) A program string stored in the knowledge variable description of "spring constant" is executed.

7) "LoadConstN table output item description identification value" is executed.
8) "LoadConstN table description identification value" is executed.
9) "Load spring type" is executed. Since a variable "spring type" is an input value, the value is input.
10) "SelectFromTable" is executed.
11) "Stop" is executed to return to the operation of "spring deflection".
12) "Divide" is executed. As a result, the value of load*spring constant" is obtained.
13) "Stop" is executed to return to the operation of "condition of deflection".
14) "LoadConstN 100" is executed.
15) "LessOrEqual" is executed. As a result, a value "spring deflection<=100" is obtained.

Since the program is executed while the dependency among knowledge variables is subjected to retrospection as described above, when numerical values and magnitudes thereof are only input, the executing apparatus can execute a knowledge base while automatically specifying execution sequence.

Another effective embodiment will be described below. According to this embodiment, beside an executing means 12, an execution result holding means for holding a program executed by the executing means 12 and the execution result of the program is arranged. In this manner, when decision on business is made by using a knowledge base, knowledge serving as the base of the decision and the values of input items can be held as data. For this reason, for example, original data used in formation of a protest such as measures against the PL lows can be held as electronic data.

A knowledge base is to be built by using knowledge variables which are too enormous in number to be represented by one knowledge sheet, a plurality of knowledge bases may be related to each other. In addition, when one knowledge variable has a plurality of solutions, the solutions may be input by different knowledge bases, and the solutions may be related to each other.

In this embodiment, a knowledge base interface means 6 comprises a scenario input function for receiving scenario information for specifying execution sequence of knowledge sheets, and an alternative solution input function for specifying a knowledge sheet serving an alternative solution which is used when failure in computation of a knowledge sheet occurs during the scenario input by the scenario input function.

In addition, in this case, an execution sequence setting means 14 comprises a scenario-classified sequence specifying function for specifying an execution sequence of the knowledge sheets in the scenario on the basis of the scenario information input by the scenario input means, and an alternative solution execution control function for executing, when a knowledge sheet is a failure and a knowledge sheet serving as an alternative solution is specified by the alternative solution input function to the knowledge sheet which is a failure, a knowledge sheet serving as the other solution.

The function for inputting alternative solution is used in a case wherein one knowledge variable (e.g., "spring constant") has a plurality of operations. For example, when the spring constant is to be calculated, specification is performed by the knowledge table shown in FIG. 7A when "spring type" is input. On the other hand, when "spring type" is not known, the knowledge sheet in which the dependency shown in FIG. 5 is input. In general, a plurality of solutions are to be systemized, a condition determination sentence must be frequently used to form programs whose execution sequence are considered in detail. However, in this embodiment, when solutions are represented by knowledge sheets, respectively, and a scenario apparently shows that there are a plurality of solutions, the plurality of solutions can be systemized.

When a program generating means 8 receives a scenario by the scenario input function, the program generating means 8 generates, as attributes 16 of the scenario, a sheet set description, a sheet attribute description, and a knowledge variable description. In the sheet set description, the name of a sheet set and information of the sheet attribute description included in the sheet set are stored.

In this embodiment, execution sequence of the knowledge sheets is determined by the scenario information. For this reason, the scenario-classified sequence specifying function specifies the execution sequence of the knowledge sheets and gives the value of a knowledge variable which has been operated by execution of one knowledge sheet to a knowledge sheet to be executed next. As this common item, all knowledge variables having the same knowledge variable name may be used in common. Knowledge variables to be input/output in the knowledge sheet may be used as the common item.

When only items to be input/output in each knowledge sheet is used as the common item, even if items not to be input/output have the same item name, the apparatus correctly operates. Assume that input/output is designated and that message communication of the values of knowledge sheets is performed. In this case, even in a knowledge base built by a person in charge of business who has no knowledge related to programs, encapsulation in object-oriented programming can be realized, and recycling properties can be considerably improved.

Figure 15:
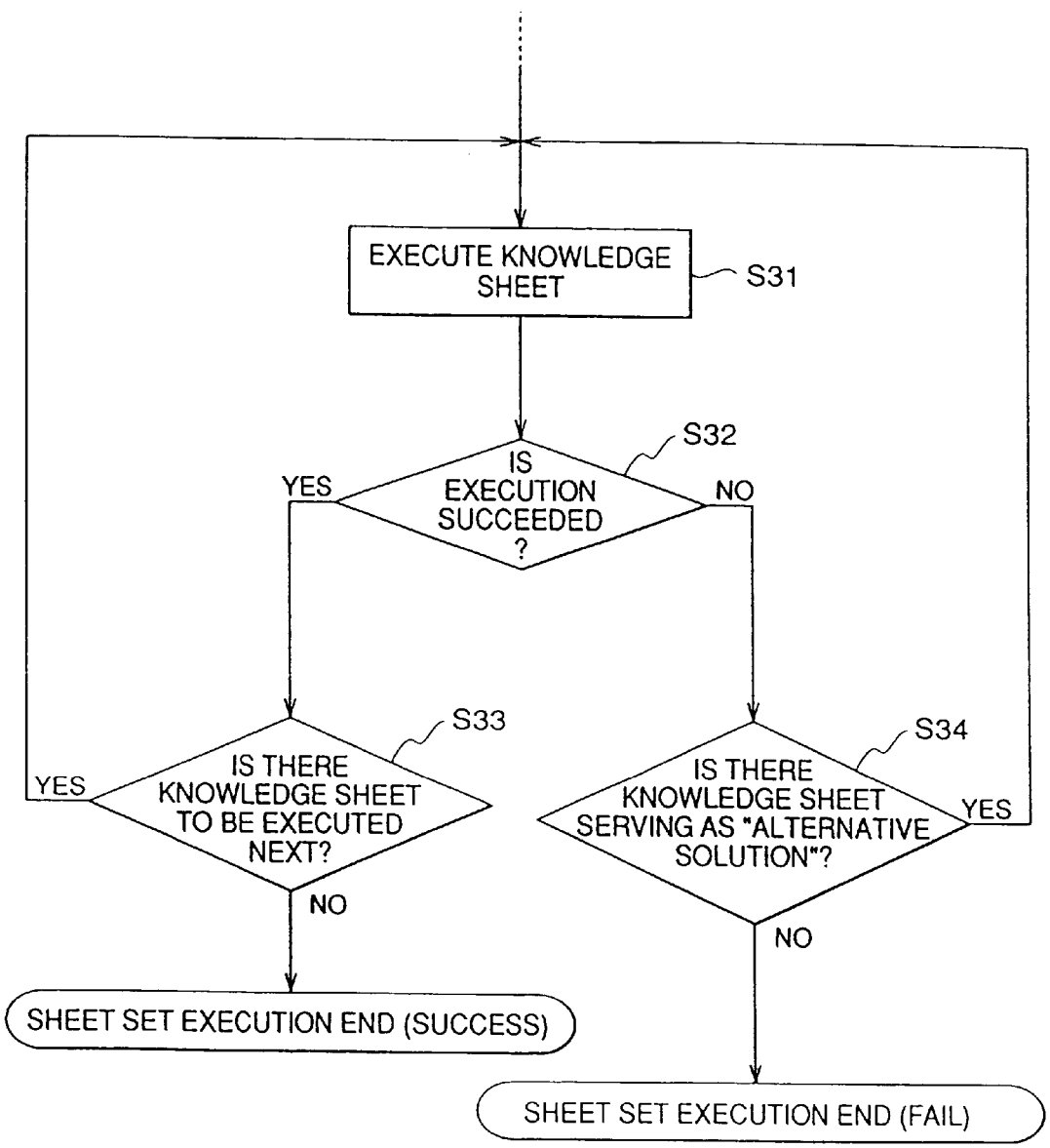
FIG. 15 is a flow chart showing execution in a case wherein a scenario is input to the knowledge base interface means shown in FIG. 1.

FIG. 15 is a flow chart showing an operation of the execution sequence setting means 14 when a scenario is input. When a plurality of sheet sets are included in one scenario, the executing apparatus inputs a sheet set name to be executed so as to specify a sheet set description. In the sheet set description, information of a sheet attribute description which is executed first. The sheet attribute description is specified, and knowledge sheets are sequentially executed.

As shown in FIG. 15, the start knowledge sheet is executed (step S31). When the execution is succeeded (step S32), a sheet set description is read from the attributes of the scenario to confirm the presence/absence of the knowledge sheet to be executed next (step S33). When there is a knowledge sheet to be executed next, the knowledge sheet is executed. On the other hand, when there is no knowledge sheet, execution of the sheet set is ended.

In step S31, the execution is not succeeded (step S32), a knowledge sheet serving as an alternative solution is retrieved. When there is a knowledge sheet serving as an alternative solution, the knowledge sheet is executed. On the other hand, when there is no alternative solution, it is determined that the execution of the sheet set is a failure, and the process is ended.

A knowledge base built by using the knowledge base system described above will be described below.

In an embodiment shown in FIGS. 16 to 29, when there are a plurality of shipping markets, a wholesaler of fruits selects a market where the maximum profit can be obtained on the basis of the relationship between sales and required transportation charge while the conditions are satisfied.

Industrial knowledge related to selection of the shipping markets and representation thereof will be described below with reference to FIGS. 16 to 23. In this embodiment, "knowledge variable" is called "design variable", and "operation" is called "value calculating method". Here, "knowledge condition" is called "design condition".

"Input commodities" are "strawberry", "grape", and "orange". More specifically, on business, the three types of commodities are dealt with on this business. "Input weight" requests a person who executes a knowledge base to input values. In daily business, the input weight changes.

"Requested delivery period" is a request of a delivery period from arrival to shipment which changes depending on commodities, and is represented as a knowledge table. FIG. 17 is a view showing the contents of a knowledge table in which the values of the requested delivery periods of the commodities. Here, industrial knowledge that "strawberry" must be delivered within one day and that "orange" must be delivered within five days is input.

The commodities are different in handling during transportation, an additional transportation charge is required according to "handling request". In FIG. 17, handling types are represented by numerical values of 0 to 2. The "handling request" and "requested delivery period" are read by select sentences from a commodity table shown in FIG. 17.

In the industrial knowledge, a market candidate is handled as a selection. However, since the market candidate is a character string, representation as a selection is easily redundant. In this case, in consideration of facility of change after the fact, a market No is added to the market candidate.

FIG. 18 is a view for explaining a table to which the relationship between market number and market candidates are input. The market candidates are defined as described above, as shown in FIG. 16, so that it is represented by FOR sentences that the market candidates are handled as selections. When the market No is increased one by one from 1 to 8, the markets No. 1 to No. 8 are selected. As a result, it can be represented that the market candidates are selections.

When a market candidate is selected from a table "market candidate" by a select sentence, a market delivery period and a market distance are input. The market delivery period is read from quotation table 2 (delivery period) shown in FIG. 19. More specifically, it is input to the table that three days are required for delivery to MARKET1, and it is input to the table that two days are required for delivery for MARKET8. "Delivery period" is specified by a select sentence by using the "market candidate" and the "input commodity". Similarly, the market distance is read from quotation table 2 (distance) shown in FIG. 20.

Here, a condition that a market delivery period must satisfy a requested delivery period corresponding to a commodity is input. For example, according to the industrial knowledge shown in FIG. 17, a commodity "grape" must be delivered within two days. On the other hand, since three days are required for delivery to MARKET2 as shown in FIG. 19, the market candidate "MARKET2" cannot be selected for the commodity "grape". The conditions or limits of such decision are input to the knowledge sheet shown in FIG. 16 as the magnitudes of numerical values. In this embodiment, it is required only to input a condition "market delivery period<=requested delivery period". This means that a market delivery period must be shorter than a requested delivery period.

Quotations for markets are input. As shown in FIG. 21, prices per kg are input according to a market candidate and a commodity. This means that the price of strawberries per kg is 1,500 yen in Market A. A design variable "quotation" is selected from an input commodity and a market candidate by a select sentence.

Sales are obtained by quotation×input weight. Since the "input weight" is changed everyday depending on business, an input request is performed to a user.

A transportation charge is operated. The transportation charge is the sum of a basic transportation charge, additional transportation charge 1, and additional transportation charge 2. As shown in FIG. 22, since the basic transportation charge (BASIC CHARGE) and additional transportation charge 1 (ADDITIONAL CHARGE1) are determined depending on the distance, these values are represented as a table. Since the market distance is determined depending on the market candidate, the basic transportation is read by a select sentence by using the market distance. Since additional transportation charge 1 is calculated on the basis of the relationship between an additional increase and an input weight, an additional unit price is read from a transportation table, and additional transportation 1 is calculated by using the additional unit price and an input weight.

Additional transportation charge 2 is determined by a method of handling a commodity and a distance. For this reason, additional transportation charge 2 is calculated from an additional increase table on the basis of the market distance and the handling request. The transportation charge is obtained by the basic transportation charge+additional transportation charge 1+and additional transportation charge 2. Here, a transportation charge is calculated by changing a market candidate again, so that execution sequence need not be input.

Profit can be represented by sales—transportation charge. The profit is optimized under the selections of market candidates. By using a MAXIMIZE sentence, "maximize profit value" is input.

After industrial knowledge is input, assume that it is aware that a basic transportation charge is actually a unit price per input weight. In this case, according to this embodiment, it is satisfactory that dependency related to a basic transportation charge is simply input to the end of the knowledge sheet. More specifically, input sequence of design variables (knowledge variables) are not limited to specific sequence.

As described above, industrial knowledge is input as a knowledge base by the knowledge base interface means 6. Any further designation for executing a detailed program is not required, and the knowledge base shown in FIGS. 16 to 23 is automatically executed by the knowledge base system according to this embodiment.

In the knowledge base system, the program generating means 8 converts the contents of a knowledge sheet and a knowledge table (table) into the programs 18 and the attributes 16. FIG. 24 is a view for explaining generation of attributes. As shown in FIG. 24, when the scenario of the embodiment is executed, the program generating means 8 reads the number of sheets, the number of tables, the number of knowledge variables (design variables) and translates the methods of calculating respective values and the contents of the tables into programs.

In addition, the execution sequence setting means 14 performs control to compute "delivery period condition" serving as an item that a design condition is determined. Since "input commodity" depending on "delivery period condition" must be input to decide the delivery condition, the executing means 12 performs a display on the input panel shown in FIG. 25 to urge a user to input "input commodity". When the design condition is satisfied, the execution sequence setting means 14 performs control for computing all values which satisfy the design condition to select an optimization item. For this reason, the value of an input weight required for operating a transportation charge is calculated. In this case, when a data type is displayed on an input panel, an erroneous input by a user can be prevented.

Detailed execution processes are shown in FIG. 27.

In this example, a system in which the executing apparatus according to this embodiment directly interacts a user is used. However, when a communication function with another application is arranged beside the executing apparatus, more various types of executions can be performed. In this example, the executing means 12 comprises an external communication function for exchanging a knowledge variable obtained by executing a program with external application software.

FIG. 28 is a view for explaining a case wherein general spreadsheet software is used as an input/output interface for a user. When a commodity name "grape" and a weight "250" kg are input, the input items are input to the executing means of this embodiment by the external communication function. Not only sharing of data but also designation of execution or the like are subjected to communication. Upon completion of execution of the knowledge base with respect to the inputs, as shown in FIG. 29, a value is output to the spreadsheet software. According to the above industrial knowledge, when the weight of "grape" was "250" kg, it was computed that shipment to Market 5 market could obtain the maximum profit in consideration of the transportation charge.

Furthermore, when communication between CAD software and an application is performed, for example, values which adapt the architecture standards can be sequentially output to the CAD software. For this reason, when a knowledge base according to this embodiment is executed for a very rough shape, a shape which adapts various standards can be automatically generated. This can also be applied to software for supporting cost estimation or layout software.

Figure 30:
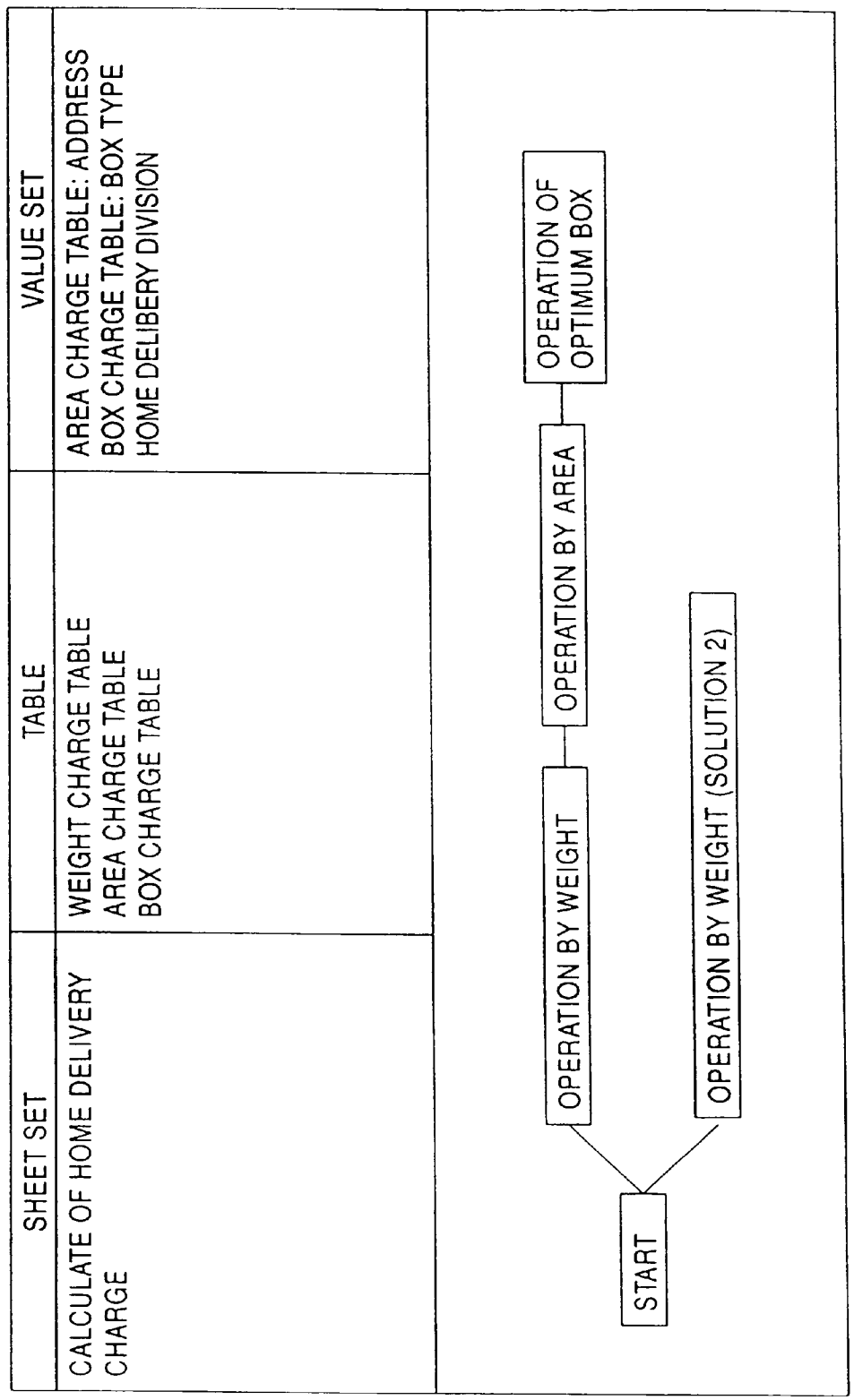
FIG. 30 is a view for explaining a display means according to another embodiment.

An embodiment having an alternative solution will be described below with reference to FIGS. 30 and 31. FIG. 30 is a view for explaining a display of a basic screen for forming a knowledge sheet according to this embodiment. Here, a knowledge base for operating a home delivery charge is built. As shown in FIG. 30, beside a knowledge base interface means 10, a display means for displaying knowledge sheets in the form of a tree on the basis of a scenario input by a scenario input function and an alternative solution input by an alternative solution input function.

As an operation of a home delivery charge, the following operation is performed. That is, when "general" and "child" have different charges, an operation of "general" by weight is performed by the first "operation by weight" sheet, and an operation of "child" by weight is performed by the second "operation by weight (solution 2). Thereafter, an operation by area and an operation of an optimum box are performed. One tree-like box shown in FIG. 30 is one knowledge sheet.

In this embodiment, "value set" is used. In the above example using market shipment, an input such as "orange" is arbitrarily performed by a user. However, since the number of types of fruits which can be used in the knowledge data base is three, the three types are displayed on an input screen to get ready for selection, and a more stable process can be performed. In the example shown in FIG. 30, "general" and "home delivery" are urged to be input as a value set of "home delivery division". In this case, "SETOF value set name" is input to the knowledge sheet.

FIG. 31A is a view for explaining an example of the value set. As shown in FIG. 31B, when SETOF sentences are used, the contents of the value set shown in FIG. 31A are displayed when values are input. In this embodiment, when "home delivery division" is "child", design conditions are not satisfied. In this case, the knowledge sheet shown in FIG. 31C is executed.

The entire disclosure of Japanese Patent Application No. 9-38307 filed on Feb. 2, 1997 including specification, claims drawings and summary are incorporated herein by reference in its entirety.

What is claimed is:

1. A knowledge base system of a computer system that executes a knowledge base, comprising:

a recording medium, readable by a computer, that stores a knowledge base file, said knowledge base file comprising:

an output knowledge variable;

knowledge variables that operate said output knowledge variable; and a computing equation of declarative representation that utilizes said knowledge variables using operands as other knowledge variables, and means for executing said knowledge base in the computers comprising:

means for translating said computing equation of declarative representation into a computer program;

means for retrieving dependence of said output knowledge variable on other knowledge variables;

means for setting an execution sequence of said computer program with reference to said dependence; and means for making one of an input request to a user and for executing said computer program with reference to said set execution sequence, wherein said means for setting an execution sequence comprises:

means for controlling one of operated and non-operated attributes for respective knowledge variables; and means for carrying up said execution sequence of said computer program concerning a non-operated knowledge variable referred by said executing means executing another program having an operand of said non-operated knowledge variable.

2. A knowledge base system that builds and executes a knowledge base, comprising:

an apparatus that builds said knowledge base, having:

interface means for receiving said knowledge base by a user, said interface means comprising a knowledge sheet, said knowledge sheet comprising:

a field that stores an output knowledge variable;

input and local fields that store knowledge variables that operate said output knowledge variable; and another field that stores a computing equation of declarative representation that utilizes said knowledge variables, using operands as other knowledge variables; and computer program generating means for generating a computer program in accordance with said knowledge sheet, said computer program generating means comprising:

means for translating said computing equation of declarative representation into a computer program; and means for producing attributes of knowledge variables in said knowledge sheet, and an apparatus that executes said knowledge base, having:

means for retrieving dependence of said output knowledge variable on other knowledge variables;

means for setting an execution sequence of the computer program, with reference to said dependence; and means for making one of an input request to a user and for executing the computer program, wherein said means for setting said execution sequence comprises:

means for controlling one of operated and non-operated attributes for respective knowledge variables; and means for carrying up said execution sequence of the computer program concerning a non-operated knowledge variable referred by said executing means executing another program having an operand of said non-operated knowledge variable.

3. A knowledge base system according to claim 2, wherein said means for setting the execution sequence comprising means for requesting to a user to input a value of the knowledge variable which is referred by said executing means executing the other program having the operand of said non-defined knowledge variable.

4. The knowledge base system of claim 3, wherein said knowledge base executing means comprises means for storing said executed program, character information of an execution result of the another program, and said inputted value of said non-defined knowledge variable.

5. A knowledge base system that builds and executes a knowledge base, comprising:

an apparatus that builds said knowledge base, having:
interface means for receiving said knowledge base by a user, said interface means comprising a knowledge sheet, said knowledge sheet comprising:
a field that stores an output knowledge variable;
input and local fields that store knowledge variables that operate said output knowledge variable; and
another field that stores a computing equation of declarative representation that utilizes said knowledge variables, using operands as other knowledge variables; and computer program generating means for generating a computer program in accordance with said knowledge sheet said computer program generating means comprising:
means for translating said computing equation of declarative representation into a computer program; and
means for producing attributes of knowledge variables in said knowledge sheet, and an apparatus that executes said knowledge base, having:
means for retrieving dependence of said output knowledge variable on other knowledge variables;
means for setting an execution sequence of the computer program, with reference to said dependence; and
means for making one of an input request to a user and for executing the computer program, wherein said interface means comprises a knowledge table, said knowledge table comprising:
a field that stores at least one table input condition having a range description; and
a field that stores an output value specified by said table input condition,
wherein said computing equation of declarative representation includes a computing equation which refers to said knowledge table to obtain an output value of said knowledge table,
said program generating means comprising means for translating said knowledge table into a computer program having a plurality of if sentences classified by table input conditions having said range description.

6. A knowledge base system that builds and executes a knowledge base, comprising;

an apparatus that builds said knowledge base, having:
interface means for receiving said knowledge base by a user, said interface means comprising a knowledge sheet, said knowledge sheet comprising:
a field that stores an output knowledge variable;
input and local fields that store knowledge variables that operate said output knowledge variable; and
another field that stores a computing equation of declarative representation that utilizes said knowledge variables, using operands as other knowledge variables; and computer program generating means for generating a computer program in accordance with said knowledge sheet, said computer program generating means comprising:
means for translating said computing equation of declarative representation into a computer program; and
means for producing attributes of knowledge variables in said knowledge sheet, and an apparatus that executes said knowledge base, having:
means for retrieving dependence of said output knowledge variable on other knowledge variables;
means for setting an execution sequence of the computer program, with reference to said dependence; and
means for making one of an input request to a user and for executing the computer program, wherein said computing equation of declarative representation includes:
a knowledge condition for values to which knowledge variables can be set in said knowledge sheet,
said means for setting an execution sequence comprising:
means for setting the sequence of said computer program having a knowledge condition executing before another program having said knowledge variable;
means for ordering the executing of the another program having said knowledge variable when an operation result of said computing equation satisfies said knowledge condition; and
means for determining an operation failure to end the executing of the another program when said operation result of said computing equation does not satisfy said knowledge condition.

7. A knowledge base system according to claim 6, wherein said computing equation of declarative representation including a computing equation for defining selections for the values of the knowledge variables in the knowledge sheet, and said knowledge base executing means comprises means for replacing the sequence of the selections when the operation result of the computing equation of the condition does not satisfy the knowledge condition.

8. A knowledge base system according to claim 7, wherein the computing equation of declarative representation including:

(a) a computing equation for defining knowledge optimization for the values of the knowledge variables in the knowledge sheet, and (b) said knowledge base executing means comprises:

(i) means for computing equation by all the selections; and (ii) means for selecting an operation result by the computing equation for defining optimization from a plurality of operation results of the respective selections.

9. A knowledge base system according to claim 8, wherein (a) said program generating means comprising:

(i) means for forming a condition variable list serving as a list of knowledge variables whose operation is a computing equation for defining a knowledge condition; and (ii) means for forming an optimization variable list serving as a list of knowledge variables whose operation is the computing equation for defining optimization, and (b) said knowledge base executing means comprises:

(i) means for selecting all the selections to operate an operation result which satisfies all conditions specified by the condition variable list; and (ii) means for computing the knowledge variables of the optimization variable list when there is at least one operation result which satisfies all the conditions.

10. A knowledge base system that builds and executes a knowledge base comprising:

an apparatus that builds said knowledge base, having:
interface means for receiving said knowledge base by a user, said interface means comprising a knowledge sheet, said knowledge sheet comprising:
a field that stores an output knowledge variable;
input and local fields that store knowledge variables that operate said output knowledge variable; and
another field that stores a computing equation of declarative representation that utilizes said knowledge variables, using operands as other knowledge variables; and
computer program generating means for generating a computer program in accordance with said knowledge sheet, said computer program generating means comprising:
means for translating said computing equation of declarative representation into a computer program; and
means for producing attributes of knowledge variables in said knowledge sheet, and an apparatus that executes said knowledge base, having:
means for retrieving dependence of said output knowledge variable on other knowledge variables;
means for setting an execution sequence of the computer program, with reference to said dependence; and
means for making one of an input request to a user and for executing the computer program, wherein
said knowledge base building apparatus comprising:
means for receiving a scenario for specifying an execution sequence of knowledge sheets; and
means for receiving a knowledge sheet serving as an alternate solution when computation of said knowledge sheets of the scenario is a failure,
said knowledge base executing means comprising:
means for setting an execution sequence of said knowledge sheets in the scenario with references to the scenario; and means for executing said knowledge sheets serving as said alternative solutions when execution of knowledge sheets is a failure and knowledge sheets serving as alternative solutions are specified to knowledge sheets.

11. A knowledge base system according to claim 10, wherein said knowledge base building apparatus comprising display means for displaying the knowledge sheets in the form of a tree with reference to the scenario and the alternative solution.

12. A computer-readable memory that stores a program controlling a computer for executing a knowledge base having knowledge variables and a computing equation of declarative representation that utilizes said knowledge variables using operands of other knowledge variables, said program comprising:

means for retrieving dependency among said knowledge variables used until an output knowledge variable is operated;

means for setting an execution sequence of programs for operating said knowledge variables with reference to said dependency; and means for making one of an input request of a user and executing the programs with reference to said execution sequence, wherein said means for retrieving dependency among said knowledge variables comprises:

means for managing one of operated attributes and non-operated attributes for respective knowledge variables;

means for carrying up, when a knowledge variable serving as an operand of the program is not operated, said execution sequence of the program of a non-operated knowledge variable; and means for executing the program of the non-operated knowledge variable which is carried up.

13. A computer-readable memory that stores a program controlling a computer for executing a knowledge base having knowledge variables and a computing equation of declarative representation that utilizes said knowledge variables using operands of other knowledge variables, said program comprising:

means for retrieving dependency among said knowledge variables used until an output knowledge variable is operated;

means for setting an execution sequence of programs for operating said knowledge variables with reference to said dependency; and means for making one of an input request of a user and for executing the programs with reference to said execution sequence, wherein said means for executing the programs comprise:

means for requesting a user to input a value of said knowledge variable when a computing equation of a knowledge variable serving as an operand of the program is not defined in knowledge base.

14. A knowledge base system for building a knowledge base, comprising:

an interface device that receives said knowledge base by a user, said interface device comprising:
a field that stores an output knowledge variable;
input and local fields that store knowledge variables for operating said output knowledge variables; and a field that stores a computing equation of declarative representation that utilizes knowledge variables using operands as other knowledge variables; and a generating device that generates a program on the basis of said knowledge base, said generating device comprising:

a translating device that translates said computing equation of declarative representation into a computer program;

a retrieving device that retrieves a dependence of said output knowledge variable on other knowledge variables; and a setting device that sets an execution sequence of said computer program for instructing an input request and computation with reference to said dependence, wherein said knowledge base system includes at least one alternative solution.

* * * * *

UNITED STATES PATENT AND TRADEMARK OFFICE
CERTIFICATE OF CORRECTION

PATENT NO. : 6,035,292
DATED : March 7, 2000
INVENTOR(S) : S. MATSUSHITA et al.

It is certified that error appears in the above-identified patent and that said Letters Patent is hereby corrected as shown below:

On the cover of the printed patent, at Item [56], References Cited, Other Publications, line 1, change "evelopment of scheduleing" to ---development of scheduling---.

On the cover of the printed patent, at Item [56], References Cited, Other Publications, line 9, change "manufature" to ---manufacture---.

On the cover of the printed patent, at Item [56], References Cited, Other Publications, line 11, change "apprach" to ---approach---.

At column 22, lines 22-23 (claim 1, lines 12-13) of the printed patent, "computers" should be ---computer,---.

At column 23, line 41 (claim 4, line 21) of the printed patent, after "sheet" insert --- , ---.

At column 25, line 29 (claim 10, line 2) of the printed patent, after "base" insert --- , ---.

At column 26, line 5 (claim 10, line 45) of the printed patent, after "to" insert --- said ---.

Signed and Sealed this

Twenty-fourth Day of April, 2001

Attest:

NICHOLAS P. GODICI

*Attesting Officer*     Acting Director of the United States Patent and Trademark Office